(12) United States Patent
Fujiwara

(10) Patent No.: US 8,707,820 B2
(45) Date of Patent: Apr. 29, 2014

(54) LOAD-SENSOR-EQUIPPED VEHICLE OPERATING PEDAL DEVICE AND LOAD-SENSOR-EQUIPPED OPERATING DEVICE

(75) Inventor: Noboru Fujiwara, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 1039 days.

(21) Appl. No.: 12/071,623

(22) Filed: Feb. 25, 2008

(65) Prior Publication Data

US 2008/0250894 A1 Oct. 16, 2008

(30) Foreign Application Priority Data

Apr. 13, 2007 (JP) ................................ 2007-106377
Dec. 21, 2007 (JP) ................................ 2007-330823

(51) Int. Cl.
*G05G 1/30* (2008.04)

(52) U.S. Cl.
USPC ............................................. 74/512; 74/560

(58) Field of Classification Search
USPC ............... 74/512–514, 560; 200/61.89, 86.5; 73/862.541, 132; 188/158; 303/3, 15, 303/20, 50, 113.4; 340/479, 438; 180/275, 180/271; 403/383
IPC ........................................................ B60T 7/06
See application file for complete search history.

(56) References Cited

U.S. PATENT DOCUMENTS

| | | | |
|---|---|---|---|
| 2,884,803 A | | 5/1959 | Willis |
| 3,052,130 A | * | 9/1962 | Kellogg et al. ................. 74/105 |
| 3,219,775 A | | 11/1965 | Carpenter |
| 3,766,342 A | * | 10/1973 | Stadelmann ............... 200/61.89 |
| 3,988,945 A | | 11/1976 | Fasano |
| 4,978,177 A | | 12/1990 | Ingraham |
| 5,217,280 A | * | 6/1993 | Nykerk et al. ..................... 303/3 |
| 5,563,355 A | | 10/1996 | Pluta et al. |

(Continued)

FOREIGN PATENT DOCUMENTS

| | | |
|---|---|---|
| CN | 1701219 A | 11/2005 |
| EP | 1 557 653 | 7/2005 |

(Continued)

OTHER PUBLICATIONS

U.S. Appl. No. 13/828,045, filed Mar. 14, 2013.

(Continued)

*Primary Examiner* — Daniel Yabut
(74) *Attorney, Agent, or Firm* — Finnegan, Henderson, Farabow, Garrett & Dunner, LLP

(57) ABSTRACT

A load-sensor-equipped vehicle operating pedal device includes a load sensor (30) having a case member (34) formed with a pair of mounting wall portions (62a, 62b) converged in a convex shape at a predetermined apex angle α. The pair of mounting wall portions (62a, 62b) are held in surface contact with a pair of rest surfaces (28a, 28b), formed in a sensor-mounting hole (28) in a fixed and positioned state. Thus, even if a direction of an input load (reactive force), applied to a clevis pin (26) varies with an operating pedal 16 being progressively depressed, the pair of rest surfaces (28a, 28b) always bear the input load via the pair of mounting wall portions (62a, 62b). This suppresses the case member (34) from flexure deforming due to stress concentration. As a result, positional displacement of a sensor is prevented regardless of a variation in the direction of the input load, improving detecting precision.

19 Claims, 21 Drawing Sheets

(56) References Cited

U.S. PATENT DOCUMENTS

| | | | |
|---|---|---|---|
| 5,964,122 | A | 10/1999 | Bonnard et al. |
| 6,234,290 | B1 | 5/2001 | Drexl et al. |
| 6,655,199 | B1 | 12/2003 | Smith |
| 7,134,327 | B2 | 11/2006 | Saito et al. |
| 7,328,933 | B2 | 2/2008 | Vitale et al. |
| 7,712,371 | B2 | 5/2010 | Fujiwara |
| 8,333,130 | B2 | 12/2012 | Fujiwara |
| 2003/0056616 | A1* | 3/2003 | Matsumoto et al. ............ 74/512 |
| 2003/0200863 | A1* | 10/2003 | Dreischarf et al. ........... 180/271 |
| 2008/0223171 | A1 | 9/2008 | Fujiwara et al. |
| 2008/0250894 | A1 | 10/2008 | Fujiwara et al. |

FOREIGN PATENT DOCUMENTS

| | | |
|---|---|---|
| EP | 1 577 184 | 9/2005 |
| EP | 1 591 331 | 11/2005 |
| JP | 11 255084 | 9/1999 |

OTHER PUBLICATIONS

U.S. Appl. No. 13/828,282, filed Mar. 14, 2013.
U.S. Appl. No. 13/828,428, filed Mar. 14, 2013.
Preliminary Amendment filed Mar. 14, 2013 in U.S. Appl. No. 13/828,045.
Preliminary Amendment filed Mar. 14, 2013 in U.S. Appl. No. 13/828,282.
Preliminary Amendment filed Mar. 14, 2013 in U.S. Appl. No. 13/828,428.
"hollow," Collins English Dictionary—Complete & Unabridged 10$^{th}$ Edition. HarperCollins Publishers. May 24, 2011. <Dictionary.com http://dictionary.reference.com/browse/hollow>.
Office Action in Chinese Patent Appln. No. 200810086068.0, dated Jul. 29, 2010.

* cited by examiner

FIG.19A
FIG.19B
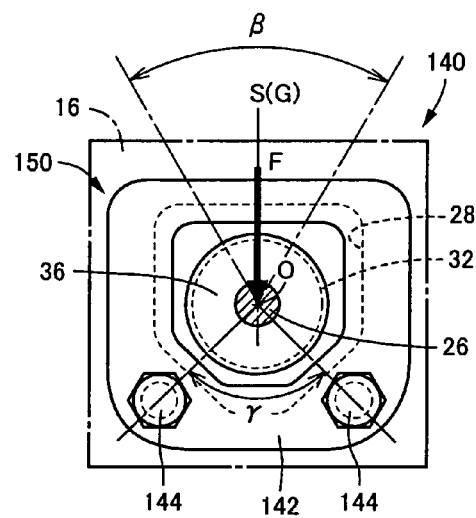
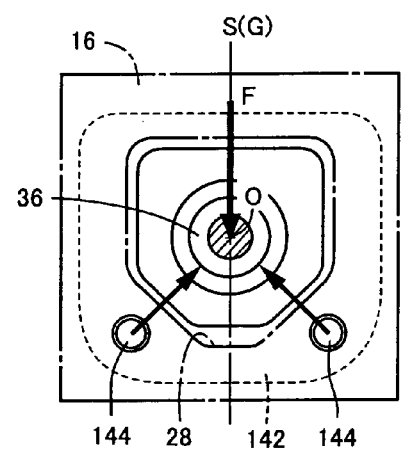

LOAD-SENSOR-EQUIPPED VEHICLE OPERATING PEDAL DEVICE AND LOAD-SENSOR-EQUIPPED OPERATING DEVICE

This application is based on Japanese Patent Application No. 2007-106377 and the Japanese Patent Application No. 2007-330823, and contents thereof is incorporated herein.

BACKGROUND OF THE INVENTION

1. Field of the Invention

This invention relates to operating devices such as vehicle operating pedal devices or the like, and more particularly, to improvement of a load-sensor-equipped operating device having a load sensor for electrically detecting an operating force.

2. Description of the Related Art

Load-sensor-equipped operating devices have heretofore been known with one type including (a) an operating member displaceably operate; (b) a reactive member; (c) at least one pivotably connecting section; and (d) a load sensor. An operating force of the operating member is transmitted to the reactive member, on which a reactive force acts according to operating force. At least one pivotably connecting section is interposed between the operating member and the reactive member to interconnect a pair of members to be pivotable, relative to each other about a connecting pin, through which the operating force is transmitted. The load sensor electrically detects such an operating force.

Patent Publication 1 (U.S. Pat. No. 5,563,355) discloses a vehicle brake pedal device, which represents one example of the load-sensor-equipped operating device. This load-sensor-equipped operating device is structured such that a pushrod (reactive member) protruding from a master cylinder, is connected to the connecting pin extending from an operating pedal at side portions thereof, to be relatively movable in an axial direction. Thus, a displacing amount of the pushrod relative to the connecting pin against an urging force of a spring is detected by a sensor.

With such a device disclosed in Patent Publication 1, however, since the pushrod needs to be formed with an elongate hole for connection to the connecting pin to allow the pushrod to move relative to the connecting pin axially, no usual pushrod can be used intact. Further, since the pushrod is pivoted i.e. pivotable relative to the connecting pin with a depressing displacement of the operating pedal, the spring urging the pushrod and the sensor detecting the displacement amount are required, to be mounted pivotably with respect to the connecting pin. As a result, the device becomes complicated in structure.

In addition, the pushrod, the spring and the sensor are placed on the operating pedal at the side areas thereof, so that the brake pedal particularly needs to take a robust i.e. rigid structure for ensuring a stable operating condition. This results in an increase in size of the device as a whole, causing an increase in production cost.

As shown in FIGS. 21A and the 21B, on the contrary, a technology has been taken into consideration to provide a structure, not known, for mounting a load sensor on a connecting position of a clevis pin in a compact layout. FIGS. 21A and the 21B are views showing an operating pedal device 200 for a vehicle service brake. FIG. 21A is a front view and FIG. 21B is an enlarged view showing a cross sectional view taken on line XXIA-XXIA of FIG. 21A.

A plate-like operating pedal 16 is mounted on a pedal support 12, integrally fixed to a vehicle, to be pivotable about an axis of a support shaft 14 that extends in an approximately horizontal direction. The operating pedal 16 depressable in operation by a driver in response to a braking requirement, has a lower distal end including a depressable portion (pad) 18, and an intermediate portion to which an operating rod 22 of a brake booster is connected via a pivotably connecting section 20. The pivotably connecting section 20 includes a U-shaped clevis 24, integrally connected to the operating rod 22 at one end thereof by means of a screw coupling or the like, and a clevis pin 26 mounted on the operating pedal 16 in parallel to the support shaft 14. The pivotably connecting section 20 is configured to connect the operating rod 22 and the operating pedal 16 to each other pivotably about an axis of the clevis pin 26.

The clevis pin 26 corresponding to the connecting pin, has both axial end portions, protruding from the operating pedal 16 on both sides thereof, which are retained with the U-shaped clevis 24 via a snap ring or a retaining pin or the like in non-escaping fashion. An output corresponding to the operating force acting on the operating pedal 16 is transmitted to the operating rod 22 via the pivotably connecting section 20, and the resulting reactive force equivalent to the output acts on the operating rod 22 by means of the brake booster. The operating rod 22 corresponds to a reactive member. With an operating pedal device of a by-wire type employed to electrically control a wheel brake, the reactive member, on which a predetermined reactive force acts, that is which receives the predetermined reactive force, due to an action of a reactive mechanism or the like, is connected in place of the operating rod 22.

The operating pedal 16 has a coupling position, connected with the clevis pin 26, which is formed with a sensor-mounting hole 202 with a diameter larger than that of the clevis pin 26. A load sensor 204, located in an annular space between the sensor-mounting hole 202 and the clevis pin 26, includes a cylindrical strain body or strain-triggering body 206 for detecting a load applied to thereto in a radial direction. The load sensor 204 further includes an annular case member 208 disposed outside the strain body 206, and a shaft-like member 210 disposed an area inside the strain body 206.

The case member 208 is comprised of a cylindrical inner circumferential connecting portion 208a, a cylindrical outer circumferential wall 208b, a plate-like connecting flange 208c and a positioning flange 208d, which are formed in a double-layered cylindrical structure as a whole. The connecting portion 208a, placed in an inner circumferential area thereof has an axial area to which one axial end portion of the strain body 206 (an upper end portion thereof as viewed in FIG. 21B) is integrally fixed by press fitting, welding or the like. The outer circumferential wall 208b is formed in an outer circumferential area of the connecting portion 208a so as to surround the connecting portion 208a. The connecting flange 208c has an area in which the connecting portion 208a and the outer circumferential wall 208b are integrally connected to each other at axial ends thereof. The positioning flange 208d is formed continuous or contiguous with the connecting flange 208c and protrudes radially outward from the outer circumferential wall 208b. The case member 208 is arranged such that the outer circumferential wall 208b is fitted to the sensor-mounting hole 202, and the positioning flange 208d is contacted with the operating pedal 16 on one side thereof with a leaf spring or the like (not shown) in non-dismounting fashion.

The shaft-like member 210 integrally holds the other axial end (a lower end portion in FIG. 21B) of the strain body 206 by press fitting, welding or the like, and has an insertion bore 210h through which the clevis pin 26 is extended. The clevis pin 26, the insertion bore 210h and the clevis 24 are made relatively rotatable. Thus, they are rendered operative to relatively rotate lessened in friction with the operating pedal 16 being depressed. However, bearings or bushes may be mounted in the associated component parts to reduce frictions depending on needs.

Thus, the case member 208 and the shaft-like member 210 are connected to each other via the strain body 206. When a load, externally applied to the strain body 206 in a radial direction, that is in a direction perpendicular to the axis thereof, becomes approximately zero, the respective members 206, 208 and the 210 remain under states approximately concentric to i.e. coaxial with an axis of the clevis pin 26. In contrast, if a load is radially applied to between the case member 208 and the shaft-like member 210 due to a reactive force of the operating rod 22 in accordance with depression of the operating pedal 16, the strain body 206 is shear-deformed. As a result, the case member 208 facing the operating pedal 16, displaces relative to the shaft-like member 210 in a direction (leftward as viewed in FIG. 21A) to be closer relative to the operating rod 22.

An annular space is provided between the case member 208 and the shaft-like member 210 for permitting these members to be relatively displaced in a radial direction, and shear deformation of the strain body 206 is permitted. The strain body 206 is made of metallic material such as ferritic stainless steel or the like that is elastically deformable when applied with a load in a radial direction. Thus, in accordance with depression of the operating pedal 16, the resulting operating force causes the strain body 206 to be shear-deformed. For detecting a shear strain of the strain body 206, strain detecting elements such as strain resistance elements or the like are mounted on an outer circumferential surface or inner circumferential surface of the strain body 206 in electrical connection to a control circuit section of the vehicle via the wire harness 56. Thus, the control circuit section can detect a depressed operating force based on electric signals output from the strain detecting elements.

With the vehicle operating pedal device 200 of such a structure, the pivotably connecting section 20 transmits the operating force applied to the operating pedal 16 to the operating rod 22. With the pivotably connecting section 20, the operating pedal 16 connected to the operating rod 22 via the clevis pin 26 to be pivotable relative to each other, has the sensor-mounting hole 202 to allow the cylindrical load sensor 204 to be mounted in the annular space defined between the sensor-mounting hole 202 and the clevis pin 26. This minimizes the occurrence of rotational moment such as torsion or the like, enabling the operating pedal device 200 to be formed in a simple and compact structure as a whole. In addition, the operating pedal device 200 can employ the same peripheral units, like the operating rod 22 and the clevis 24, as those of the conventional pedal device, enabling a reduction in production cost of the device.

With the vehicle operating pedal device 200 of such a structure, however, the case member 208 of the load sensor 204 is formed in the cylindrical configuration. With an input load (a reactive force in this case) F transmitted from the clevis pin 26 to the case member 208 passing through the shaft-like member 210 and the strain body 206, substantially one point of the outer circumferential wall 208b of the case member 208 is pressed against the inner peripheral surface of the sensor-mounting hole 202 to bear the input load F.

Thus, as shown in FIGS. 22A and the 22B in exaggerated manner, the case member 208 has a fear of encountering flexure deformation due to stress concentration. FIG. 22A shows the load sensor 204 remained under an unloaded state and FIG. 22 shows the load sensor 204 under a state applied with the load F. FIGS. 22A and the 22B have upper areas shown in front views and the lower areas shown in cross sectional views. Due to flexure deformation caused in the case member 208, the strain body 206 encounters undesirable deformation like bending, torsion or the like, and in alternative, the strain body 206 has a lessened deformation amount, resulting in a possibility of degraded detecting precision of the operating force.

As the operating pedal 16 pivotable about the axis of the support shaft 14 in accordance with depression of the operating pedal, further, the operating rod 22 and the operating pedal 16 are also pivoted relative to each other about the axis of the clevis pin 26. This causes the input load F to vary in applied direction, resulting in a possibility of causing the case member 208 to be displaced in a swaying i.e. rocking mode caused by a clearance between the case member 208 and the sensor-mounting hole 202. In view of this, there is a fear of occurrence of degraded detecting precision of the operating force.

If the input load F is varied in applied direction with the case member 208 remains flexure deformed, the strain body 206 becomes complicated in deforming pattern with a resultant occurrence of easily causing a variation in deforming rate as shown in FIGS. 23A and 23B in exaggerated manner. This results in further degraded detecting precision with a possibility of a lack of stability. FIG. 23A shows a case in which both the outer circumferential wall 208b of the case member 208 and the strain body 206 are encountered with flexure deformation. FIG. 23B shows another case in which the input load F is applied to the strain body 206 in a varying direction with both the outer circumferential wall 208b and the strain body 206 remained flexure deformed, under which the rest of the strain body 206 except for an acting area of the input load F is also deformed. In this case, even when the input load F is applied at the same rate, the strain detecting elements 212 and the 214 have less average strain value than those of the strain detecting elements 212 and the 214 under states shown in FIG. 23A.

With the operating pedal device 200 used in actual practice, since the input load F increases depending on a depressing stroke of the operating pedal 16, there is a fear of a difficulty occurred in correctly detecting the increased input load F, i.e., the operating force.

SUMMARY OF THE INVENTION

The present invention has been completed with the above view in mind and has an object to provide an operating device equipped with a load sensor, which is provided in a pivotably connecting section to detect an operating force transmitted through a connecting pin, and which is operative to electrically detect the operating force based on a relative displacement between a shaft-like member and a case member operative to be relatively displaced in a direction perpendicular to an axis of the shaft-like member, with increased detecting precision.

For achieving the above object, a first aspect of the present invention is related to a load-sensor-equipped vehicle operating pedal device, which comprises (a) an operating pedal mounted on a pedal support fixedly secured to a vehicle, to be pivotable about an axis of a support shaft and depressable by an operator; (b) a reactive member receiving an operating force of the operating pedal and generating a reactive force corresponding to the operating force; (c) at least one pivotably connecting section, interposed between the operating pedal and the reactive member, having a pair of component members pivotably connected relative to each other about a connecting pin, and transmitting the operating force through the connecting pin; and (d) a load sensor electrically detecting the operating force.

(e) The load sensor includes (e-1) a shaft-like member, (e-2) an annular case member being disposed radially outside the shaft-like member to be relatively displaced thereto in a direction perpendicular to an axis of the shaft-like member and radially surrounding the shaft-like member, (e-3) a strain body disposed between the shaft-like member and the case member to straddle thereover, and (e-4) strain detecting elements fixed to the strain body, (e-5) wherein the reactive force causes the shaft-like member and the case member to relatively move in the direction perpendicular to the axis of the shaft-like member to deform the strain body such that the strain detecting elements detect a deformation of the strain body; (f) the case member is disposed on a sensor mounting member comprised of either one of component members connected to each other via the connecting pin in the pivotably connecting section, and the shaft-like member is connected to the other one of the component members via the connecting pin; (g) the case member has a plurality of mounting portions engaged with a plurality of load receiving portions formed on the sensor-mounting member respectively, and is positionally disposed in the sensor-mounting member in a fixed posture; and (h) even when a direction of an input load F transmitted from the shaft-like member to the case member via the strain body relatively varies due to relatively pivotal movement of the pivotably connecting section in accordance with depression of the operating pedal, the plurality of load receiving portions always bear the input load F via the plurality of mounting portions.

A second aspect of the present invention is featured, in the load-sensor-equipped vehicle operating pedal device of the first aspect, that (a) the plurality of mounting portions include a pair of flat mounting surfaces convexly formed on a plane perpendicular to the axis of the shaft-like member with a predetermined apex angle α, and the plurality of load receiving portions include a pair of flat rest surfaces concavely formed in the sensor-mounting member in conjunction with the mounting surfaces; and (b) the case member is positioned in a fixed posture such that, with the pair of mounting surfaces being brought into surface contact with the pair of rest surfaces respectively, the pair of mounting surfaces are pressed against the pair of rest surfaces by the input load F.

A third aspect of the present invention is featured, in the load-sensor-equipped vehicle operating pedal device of the second aspect, that orientations of the rest surfaces and the apex angle α are determined such that even when the direction of the input load F relatively varies due to the relatively pivotal movement of the pivotably connecting section in accordance with depression of the operating pedal, the pair of mounting surfaces are always pressed against the pair of rest surfaces respectively based on the input load F.

A fourth aspect of the present invention is featured, in the load-sensor-equipped vehicle operating pedal device of the third aspect, that the orientations of the rest surfaces and the apex angle α are determined such that even when the direction of the input load F relatively varies due to the relatively pivotal movement of the pivotably connecting section in accordance with depression of the operating pedal, the pair of mounting surfaces always generate component forces oriented toward an apex point of a convex configuration due to reactive forces arising from the rest surfaces.

A fifth aspect of the present invention is featured, in the load-sensor-equipped vehicle operating pedal device of the second to fourth aspects, that the apex angle α is selected smaller than an angle (180°-β) for a variable angle β in a direction of the varying input load F varying due to the relatively pivotal movement of the pivotably connecting section in accordance with depression of the operating pedal.

A sixth aspect of the present invention is featured, in the load-sensor-equipped vehicle operating pedal device of one of the second to fifth aspects, that the pair of mounting surfaces are formed symmetrically with respect to a neutral plane S involving the apex point of the convexed configuration converged with the pair of mounting surfaces, and the axis of the shaft-like member in an unloaded state.

A seventh aspect of the present invention is featured, in the load-sensor-equipped vehicle operating pedal device of the sixth aspect, which that (a) the case member has (a-1) an inner circumferential connecting portion to which the strain body is integrally connected, (a-2) a cylindrical outer circumferential wall formed outside the connecting portion to surround the connecting portion, and (a-3) a plate-like connecting flange connecting the outer circumferential wall and the connecting portion integrally to each other; and (b) the outer circumferential wall has (b-1) a pair of plate-like mounting wall portions of which outer side surfaces form the pair of mounting surfaces, (b-2) a pair of flat plate-like parallel wall portions formed continuously to the pair of mounting wall portions in parallel to the neutral plane S and in symmetrical with the neutral plane S, and (b-3) a clearance is provided between the sensor-mounting member and the outer circumferential wall except for the mounting wall portions.

A eighth aspect of the present invention is featured, in the load-sensor-equipped vehicle operating pedal device of the sixth or seventh aspect, that (a) the strain body has a hollow cylindrical shape and is disposed concentrical with the shaft-like member; and (b) a plurality of strain detecting elements are provided on an outer circumferential surface or an inner circumferential surface of the strain body over a predetermined angular range which is symmetrical with respect to the neutral plane S.

A ninth aspect of the present invention is featured, in the load-sensor-equipped vehicle operating pedal device of the eights aspect, that four strain detecting elements are provided at four positions demarcated with the neutral plane S and a plane passing through the axis of the strain body to be perpendicular to the neutral plane S, which are symmetrical with respect to the neutral plane S.

A tenth aspect of the present invention is featured, in the load-sensor-equipped vehicle operating pedal device of one of the second to ninth aspects, that (a) the sensor-mounting member includes a plate-like member being pivotably connected to the reactive member relative thereto about the connecting pin, and having a sensor-mounting hole penetratingly formed with the pair of rest surfaces; (b) the load sensor allows the case member thereof to be disposed in the sensor-mounting hole such that the pair of mounting surfaces are surface contacted with the pair of rest surfaces, respectively; (c) the connecting pin is inserted along the axis of the shaft-like member to protrude from both axial ends of the sensor-mounting hole; and (d) the connecting pin has both axial ends retained with a U-shaped clevis integrally fixed to the reactive member.

A eleventh aspect of the present invention is featured, in the load-sensor-equipped vehicle operating pedal device of one of the second to tenth aspects, that the strain body has a hollow cylindrical configuration of which one end and other end are integrally fixed to the case member and the shaft-like member respectively, so that a shear strain occurring in the strain body by a relative displacement between the case member and the shaft-like member in response to the reactive force is detected by the strain detecting element.

A twelfth aspect of the present invention is featured, in the load-sensor-equipped vehicle operating pedal device of one of the second to seventh aspects, that the strain body includes a plurality of flat plate-like members placed on the shaft-like member around the axis thereof at intervals spaced from each other in parallel to the axis of the shaft-like member, each of which has both axial ends unitarily fixed to the shaft-like member and the case member respectively, so that a shear strain occurring in the strain body by a relative displacement between the case member and the shaft-like member in response to the reactive force is detected by the strain detecting element.

A thirteenth aspect of the present invention is featured, in the load-sensor-equipped vehicle operating pedal device of the first aspect, that (a) the plurality of mounting portions include two fixing-mount portions provided on the mounting flange integrally formed with the case member to extend in a direction perpendicular to the axis of the shaft-like member, to be separated from each other by a predetermined opening angle $\gamma$ about the axis of the shaft-like member, and the load receiving portions include fixed-mount portions in which the fixing-mount portions are integrally fixed by predetermined fixing means; and (b) the opening angle $\gamma$ is greater than a variable angle $\beta$ of a direction of the input load F varying due to relatively pivotal movement of the pivotably connecting section in accordance with depression of the operating pedal, so that the two fixing-mount portions are determined to allow the direction of the input load F to lie in an area therebetween.

A fourteenth aspect of the present invention is featured, in the load-sensor-equipped vehicle operating pedal device of the thirteenth aspect, that the fixing means include screw members.

A fifteenth aspect of the present invention is featured, in the load-sensor-equipped vehicle operating pedal device of the thirteenth or fourteenth aspect, that the two fixing-mount portions are set in symmetric positions interposing a symmetric plane G determined to involve the axis of the shaft-like member, on an intermediate position within a range of the variable angle $\beta$ of the direction of the input load F.

A sixteenth aspect of the present invention is featured, in the load-sensor-equipped vehicle operating pedal device of one of the thirteenth to fifteenth aspects, that the case member includes an inner circumferential connecting portion to which the strain body is integrally connected, a cylindrical outer circumferential wall disposed radially outside the connecting portion to surround the connecting portion, a plate-like connecting flange integrally interconnecting the outer circumferential wall and the connecting portion to each other, and the mounting flange is extended outwardly from one end portion of the outer circumferential wall at a approximately right angle.

A seventeenth aspect of the present invention is featured, in the load-sensor-equipped vehicle operating pedal device of the fifteenth aspect, that the (a) strain body has a hollow cylindrical shape and is disposed concentrical with the shaft-like member; and (b) the plurality of strain detecting elements are provided on the strain body at the outer circumferential surface or inner circumferential surface thereof over a predetermined angular range which is symmetrical with respect to the symmetric plane G.

A eighteenth aspect of the present invention is featured, in the load-sensor-equipped vehicle operating pedal device of the seventeenth aspect, that four strain detecting elements are provided at four positions demarcated with the symmetric plane G and a plane passing through the axis of the strain body to be perpendicular to the symmetric plane G, which is symmetrical with respect to the symmetric plane G.

A nineteenth aspect of the present invention is featured, in the load-sensor-equipped vehicle operating pedal device of the sixteenth aspect, that (a) the sensor-mounting member includes a plate-like member which is pivotably connected to the reactive member relative thereto about the connecting pin, and through which a sensor-mounting hole is penetratingly formed; (b) the load sensor is disposed in the sensor-mounting member such that the outer circumferential wall of the case member is inserted into the sensor-mounting hole to provide a play over an entire circumference thereof, in a condition in which the mounting flange is contacted with a side surface of the sensor-mounting member; (c) the connecting pin is inserted along the axis of the shaft-like member to protrude toward both axial ends of the sensor-mounting hole; and (d) the connecting pin has both axial ends retained with a U-shaped clevis integrally fixed to the reactive member.

A twentieth aspect of the present invention is featured, in the load-sensor-equipped vehicle operating pedal device of one of the thirteenth to nineteenth aspects, that the strain body has a hollow cylindrical configuration of which one end and other end are integrally fixed to the case member and the shaft-like member respectively, so that a shear strain occurring in the strain body by a relative displacement between the case member and the shaft-like member in response to the reactive force is detected by the strain detecting element.

A twenty-first aspect of the present invention is featured, in the load-sensor-equipped vehicle operating pedal device one of the thirteenth to sixteenth aspects, that the strain body includes a plurality of flat plate-like members placed on the shaft-like member around the axis thereof at intervals spaced from each other in parallel to the axis of the shaft-like member, each of which has both axial ends integrally fixed to the shaft-like member and the case member respectively, so that a shear strain occurring in the plate-like member by a relative displacement between the case member and the shaft-like member in response to the reactive force is detected by the strain detecting element.

A twenty-second aspect of the present invention is related to a load-sensor-equipped vehicle operating pedal device, which comprises (a) an operating member displaceably operated; (b) a reactive member receiving an operating force of the operating pedal and generating a reactive force corresponding to the operating force; (c) at least one pivotably connecting section, interposed between the operating member and the reactive member, pivotably connecting a pair of component members relative to each other about a connecting pin, and transmitting the operating force via the connecting pin; and (d) a load sensor electrically detecting the operating force.

(e) The load sensor includes (e-1) a shaft-like member, (e-2) an annular case member being disposed radially outside the shaft-like member and surrounding the shaft-like member to be displaced relative to the shaft-like member in a direction perpendicular to the axis thereof, (e-3) a strain body disposed between the shaft-like member and the case member to straddle thereover, and (e-4) strain detecting elements fixed to the strain body, (e-5) wherein the reactive force causes the shaft-like member and the case member to move relative to each other in the direction perpendicular to the axis of the shaft-like member to deform the strain body such that the strain detecting elements detect a deformation of the strain body; (f) the case member is disposed on a sensor mounting member comprised of either one of component members connected to each other via the connecting pin in the pivotably connecting section, and the shaft-like member is connected to the other one of the component members via the connecting pin; (g) the case member has a plurality of mounting portions engaged with a plurality of load receiving portions formed on the sensor-mounting member respectively, and is positionally disposed in the sensor-mounting member in a fixed posture; and (h) even when a direction of an input load F transmitted from the shaft-like member to the case member via the strain body relatively varies due to relatively pivotal movement of the pivotably connecting section in accordance with depression of the operating pedal, the plurality of load receiving portions always bear the input load F via the plurality of mounting portions.

Various aspects of the present invention have advantageous effects as described below. With the load-sensor-equipped vehicle operating pedal device of the first aspect of the present invention, the load sensor operative to electrically detect the operating force based on the operations of the case member and the shaft-like member displaced relative to each other, is mounted on the pivotably connecting section of the predetermined sensor-mounting member to detect the operating force transmitted through the connecting pin of the pivotably connecting section. Therefore, forming the sensor-mounting hole in the sensor-mounting member to allow the load sensor to be mounted therein enables the device to be formed in a simple and compact structure as a whole. In addition, since such a structure enables the use of the same peripheral members, such as a rod and a clevis or the like, as those of the pedal device of the conventional device, the device can be formed in a structure at low cost.

The case member is postionally mounted in the sensor-mounting member with the plural mounting portions held in engagement with the plural load receiving portions formed in the sensor-mounting member, respectively, in a fixed posture. In addition, even if the direction of the input load F, transmitted from the shaft-like member to the case member through the strain body, is relatively varied due to a relatively pivotal movement of the pivotably connecting section in accordance with depression of the operating pedal, the plural load receiving portions always bear the input load F via the plural mounting portions. This minimizes flexure deformation of the case member occurring due to stress concentration.

This prevents the strain body from encountering undesirable deformation or a reduction in deformation amount (strain value) resulting from the flexure deformation of the case member, thereby providing increased detecting precision of the operating force. In addition, the device can be formed in a structure with lighter weight and lower cost than those accomplished with the other device employing high-strength material with the lessened occurrence of flexure deformation, or adopting a case member of a large size.

Even if the direction of the input load F varies due to relatively pivotal movement of the pivotably connecting section in accordance with depression of the operating pedal, the input load F can be always born with the plural load receiving portions via the plural mounting portions. Thus, the load sensor can be maintained in a fixed position and posture, so that there is no fear of degraded detecting precision of the operating force that would occur in the cylindrical case member due to the swaying displacement thereof. Moreover, the case member has minimized flexure deformation. Thus, even if the input load F varies in the direction, a deforming position of the strain body is merely caused to vary with no occurrence of a complicated deforming pattern, thereby suppressing a variation in deformation amount. As a result, the strain body has a strain value maintained at an approximately fixed level regardless of the directional variation of the input load F with the input load F kept in a fixed amount. This allows the load sensor to have increased reliability with stabilized detecting precision during the actual pedal operation with the input load F progressively increasing.

The case member of the load sensor sufficiently has the plural mounting portions and the plural load receiving portions that are held in engagement with each other. This results in improved assembling possibility of the load sensor. In addition, when assembling the load sensor to the sensor-mounting member, the other area of the sensor-mounting member than the mounting portions and the load receiving portions necessarily has no need to be formed in high dimensional precision. This alleviates required shape precision of the parts, enabling a reduction in production cost.

With the second aspect of the present invention, the load sensor includes the case member having the pair of flat mounting surfaces, convexly formed at the predetermined apex angle $\alpha$ on the plane perpendicular to the axis of the shaft-like member, which are brought into surface contact with the plurality of flat rest surfaces of the sensor-mounting member, respectively. With such a structure, the load sensor can be positioned in a fixed posture. In addition, even if the direction of the input load F transmitted from the shaft-like member to the case member through the strain body, is relatively varied due to relatively pivotal movement of the pivotably connecting section in accordance with depression of the operating pedal, the input load F can be always born with the pair of rest surfaces through the pair of mounting surfaces. This minimizes the occurrence of deformation of the case member caused by stress concentration. As a result, this prevents undesirable deformation of the strain body caused by deformation of the case member, or a reduction in a deformation amount (strain value), providing improved detecting precision of the operating force. Moreover, the device can be formed with a lighter weight and lower cost than those achieved with a case employing high-strength material with lessened flexure deformation or another case adopting a case member of a large size.

With the third aspect of the present invention, a concrete condition is regulated for the input load F to be always born with the pair of rest surfaces through the pair of mounting surfaces even when the direction of the input load F is varied due to relatively pivotal movement of the pivotably connecting section in accordance with depression of the operating pedal. Such a condition is regulated in terms of the orientations and the apex angle $\alpha$ of the rest surfaces.

With the fourth aspect of the present invention, the orientations and the apex angle $\alpha$ of the rest surfaces are specified to the condition such that the pair of mounting surfaces generate the component forces always directed toward the apex point of the convex configuration, in response to the reaction forces applied to the pair of mounting surfaces from the rest surfaces, regardless of variation of the input load F. This prevents both of these component parts from moving relative to each other independently of the frictional forces therebetween. This results in an increased reliability of preventing a positional displacement and posture variation of the load sensor, providing improved detecting precision, so that the input load F can be always born reliably with the pair of rest surfaces via the pair of mounting surfaces.

With the fifth aspect of the present invention, the apex angle $\alpha$ is selected smaller than the angle of $(180°-\beta)$ relative to the variable angle $\beta$ of the direction of the input load F. This prevents both the mounting surfaces and the rest surfaces from moving relative to each other independently of the frictional forces therebetween. Thus, the input load F can be always born reliably with the pair of rest surfaces via the pair of mounting surfaces. As a result, the positional displacement and posture variation of the load sensor can be further reliably avoided, providing improved detecting precision.

With the sixth aspect of the present invention, the pair of mounting surfaces are provided symmetrically to the neutral surface S. Therefore, designing on the orientations or the like of the rest surfaces so as to allow the pair of rest surfaces to always bear the input load F through the pair of mounting surfaces becomes easy, even when the input load F is varied in direction due to relatively pivotal movement of the pivotably connecting section in accordance with depression of the operating pedal. For instance, the rest surfaces can be designed in orientation so as to allow the direction of the input load F and the neutral surface S to be approximately aligned with each other at an intermediate point of a depressing stroke of the operating pedal. This causes the direction of the input load F to vary in an approximately symmetric relation with the center in the neutral plane S. If the apex angle α is appropriately determined, then, the input load F can be preferably always born with the pair of rest surfaces via the pair of mounting surfaces, regardless of the variation in the direction of the input load F.

Even with the fourteenth aspect of the present invention, appropriately determining the symmetric plane G results in the same advantageous effect as that of the sixth aspect of the present invention.

With the seventh aspect of the present invention, the case member has the double-layered cylindrical structure having the connecting portion, the outer circumferential wall and the connecting flange, wherein the outer peripheral surface of the outer circumferential wall has the pair of mounting wall portions forming the pair of mounting surfaces. Accordingly, the device can be formed in a structure that is light in weight and low in cost. In contrast, the pair of mounting wall portions is liable to easily and relatively deform upon receipt of the input load F. However, since the parallel wall portions are successively formed with the mounting wall portions, the outer circumferential wall has increased rigidity, thereby suitably minimizing deformation of the mounting wall portions.

Of the areas of the outer circumferential wall, the rest of the outer circumferential wall except for the mounting wall portions is disposed to be spaced from the sensor-mounting member by a small gap. This makes it possible to easily dispose the case member in the sensor-mounting member such that the outer sidewalls i.e. the mounting surfaces of the mounting wall portions, are brought into surface contact i.e. surface contacted with the pair of rest surfaces of the sensor-mounting member reliably. With such a structure, the input load F can be born only with the mounting wall portions, enabling high detecting precision to be certainly obtained.

With the eighth aspect of the present invention, the strain body having the cylindrical hollow configuration, is disposed concentric with the shaft-like member. In this case, a plurality of strain detecting elements are disposed on the outer or inner circumferential i.e. peripheral surface of the strain body over the predetermined angular range symmetrically with respect to the neutral plane S. Therefore, the operating force can be favorably detected using a bridge circuit or the like. Especially, with the plural strain detecting elements placed on both sides of the neutral plane S in areas spaced from each other symmeritically, the depressing stroke of the operating pedal can be detected based on variations in signals (strain values) of the strain detecting elements placed on both sides.

The ninth aspect of the present invention represents one embodiment of such a case wherein the plural strain detecting elements are disposed on both sides of the neutral plane S symmetrically to each other. Even the seventeenth and eighteenth aspects of the present invention substantially can render the same advantageous effects as those of the eighth and ninth embodiments, by suitably setting a symmetrical surface.

With the tenth aspect of the present invention, the member connected to the reactive member to be pivotable relative thereto about the axis of the connecting pin, is constructed to serve as the sensor mounting member on which the load sensor is mounted. Therefore, the load sensor can detect the operating force (output) transmitted from the connecting pin to the reactive member on a final stage. For instance, when an attempt is made to mechanically actuate a hydraulically operated brake or the like via the reactive member, the load sensor can detect a resulting braking force or the like with high precision. In addition, the case member is disposed in the sensor-mounting hole formed in the sensor-mounting member. The connecting pin extends along the axis of the shaft-like member concentric therewith to protrude from the sensor-mounting hole at the both axial sides thereof and has the both ends retained with the clevis. Therefore, the load sensor can detect the operating force with further increased detecting precision without causing any rotational moment, such as torsion or the like, to occur on the load sensor.

Even the nineteenth aspect of the present invention substantially has the same advantageous effects as those of the tenth aspect of the present invention.

With the twelfth aspect of the present invention, the plural flat plate-like members are mounted on the shaft-like member around the axis thereof in areas circumferentially spaced from each other to be used as the strain bodies. Properly determining the number of and positions of the plural flat plate-like members to be placed allows the input load F to act in concentration to the plate-like members. This results in greater shear strain than that achieved with the strain bodies formed in the cylindrical configuration, providing increased sensitivity and detecting precision.

Even the twenty-first aspect of the present invention substantially has the same advantageous effects as those of the twelfth aspect of the present invention.

With the load sensor of the thirteenth aspect of the present invention, the fixing-mount portions, provided on the mounting flange to be integral with the case member at two positions spaced from each other by the opening angle γ, are integrally fixed to the fixed-mount portions of the sensor-mounting member at two positions by the fixing means. In this case, the opening angle γ is selected greater than the variable angle β of the direction of the input load F variable due to the relatively pivotal movement of the pivotably connecting section in accordance with depression of the operating pedal. In addition, the two fixing-mount portions placed in the two positions, are determined such that the direction of the input load F always lies in the area therebetween. This allows the input load F to be always born with the sensor-mounting member via the fixing-mount portions and the fixed-mount portions placed in the two positions, respectively, thereby minimizing deformation of the case member due to stress concentration. As a result, this prevents undesirable deformation of the strain body caused by deformation of the case member or a reduction in a deformation mount (strain value), providing improved detecting precision of the operating force. Moreover, the device can be formed with a lighter weight and lower cost than those achieved with a case employing high-strength material with lessened flexure deformation, or another case adopting a case member of a large size.

In a case where the pair of mounting surfaces and the pair of rest surfaces are brought into surface contact with each other like those in the second aspect of the present invention, there is a possibility in that the case member is held in deviated abutting engagement or varies in posture due to dimensional variation and errors in mounting states. The posture variation results in a fear of degradation occurring in detecting precision of the operating force. However, with the thirteenth aspect of the present invention, since the fixing-mount portions placed in the two positions are integrally fixed to the fixed-mount portions by the fixing means such as screw members or the like, the case member can be always placed in a fixed posture with respect to the sensor-mounting member. As a result, high reliability is obtained with stabilized detecting precision.

With the fourteenth aspect of the present invention, since the fixing-mount portions are integrally coupled to the fixed-mount portions by the fixing means comprised of the screw members, the device can be formed in a structure at further reduced cost.

As apparent from the twenty-second aspect of the present invention, the present invention is not limited to the vehicle operating pedal device, and may have applications to various other operating devices, such as an operating pedal device and a manual-operating device, etc., than those of the vehicle. However, the load sensor has the same structure and layout structure as those of the first aspect of the present invention with the substantially same advantageous effects as those of the first aspect of the present invention. The first aspect of the present invention can be regarded to be one embodiment of the twenty-second aspect of the present invention, and the operating pedal corresponds to the operating member.

Besides the modes of the various aspects of the present invention set forth above, the present invention may be implemented in other modes described below. Although the present invention, available to be preferably applied to a service brake pedal device, may also be applied to operating devices for an accelerator and a parking use. The twenty-second aspect of the present invention may have applications to various operating devices such as an operating pedal device and a manually operated operating device of the other moving object than the vehicle.

The reactive member is comprised of an operating rod of, for instance, a brake booster, a pushrod of a brake master cylinder structured to mechanically operate a wheel brake or the like. However, the present invention may be applied to an electrically operated (with a drive-by-wire system) operating brake device for electrically controlling wheel brakes or drive units or the like, depending on an operating force detected with a load sensor. In this case, a stroke simulator or a reactive mechanism or the like is connected to a reactive member to apply a predetermined reactive force thereto.

The operating pedal and the reactive member can be directly connected to each other via a single connecting pin. In this case, it is preferable to use the relevant connecting portion and the operating pedal as the pivotably connecting section and the sensor-mounting member. Further, the intermediate lever mounted on the pedal support to be pivotable, the intermediate lever and the operating pedal may be connected to each other via a connecting link, and the intermediate lever and the reactive member may be pivotably connected relative to each other via a connecting pin. In this case, all of the connecting portion intervening between the intermediate lever and the reactive member, the connecting portion intervening between the connecting link and the intermediate lever, and the connecting portion intervening between the connecting link and the operating pedal correspond to the pivotably connecting sections, respectively. The load sensor is mounted on either one of these pivotably connecting sections to detect the operating force. Since a reactive force corresponding to the operating force also acts on the connecting portion that supports the operating pedal to be pivotable about the axis of the support shaft, the load sensor can be mounted on such a pivotably connecting section for detecting the operating force.

The load sensor serves to electrically detect the occurrence of strain of the strain body subjected to elastic deformation, using the strain detecting elements. The detected strain is then converted to a load, i.e., an operating force based on a predetermined map and a calculation formula. While the strain detecting elements may be preferably comprised of strain resistance elements such as semiconductor strain gauges of a thin film type or a thick film type, commonly used strain gauges or the like, the strain detecting elements may also be preferably comprised of other elements such as piezoelectric elements or piezoelectric converting elements, etc.

Although the load sensor is mounted in the sensor-mounting hole formed in, for instance, the plate-like sensor-mounting member so as to penetrate therethrough, it may be mounted on the sensor-mounting member at one side thereof. In addition, the connecting pin may be disposed in the shaft-like member so as to pass through, for instance, along the axis thereof. However, various modifications and changes may be made to these component parts such that the shaft-like member and the connecting pin are formed in one integral structure; and the shaft-like member and the connecting pin are spaced and mechanically connected to each other via a linkage mechanism such as a connecting link or the like.

With the load sensor of the second aspect of the present invention, the pair of mounting surfaces of the case member is disposed to be held in surface contact with the pair of rest surfaces to allow the input load F to be born with the pair of rest surfaces via the mounting surfaces. The mounting surfaces are pressed against the rest surfaces, respectively, due to the input load F. Accordingly, the mounting surfaces and the rest surfaces may be assembled to each other by one-touch operation in a way to cause the mounting surfaces to be pressed against the rest surfaces, respectively, using spring members such as, for instance, leaf springs or the like without a need for necessarily preparing robust fixing means. In addition, these component parts may be integrally fixed to each other using fixing means such as bolts or the like depending on needs.

The strain body may suitably has the cylindrical configuration like, for instance, those of the eighth- and seventeenth aspects of the present invention. However, the strain body may have the form of other shape such as an ovalized shape formed in circular arc configurations of which at least partial areas are deformed based on relative displacement between, for instance, the shaft-like member and the case member. The strain body is placed in a position such that when a tensile load or a compressive load is applied to both ends of the circular arc configurations, circular arc shaped areas are subjected to extensional deformation or flexure deformation.

A strain body formed in a doughnut-shaped configuration corresponding to the annular space between the shaft-like member and the case member can be used, which is subjected to tensile deformation, compressive deformation or flexure deformation based on relative displacement between the shaft-like member and the case member. Moreover, as represented in the twelfth and twenty-first aspects of the present invention, the strain body may be implemented in various other modes by adopting a plurality of flat plate-like members placed in areas spaced from each other around the axis.

With the fifth aspect of the present invention, the apex angle $\alpha$ is determined to be smaller than the angle of $(180°-\beta)$ using the variable angle $\beta$ related to the direction of the input load F. However, among the reactive forces acting on the pair of mounting surfaces, the component force directed to the apex point increases with a decrease in the apex angle α, causing the strain body to be easily flexure-deformed in response to stress concentration. Therefore, the apex angle α is preferably determined to be 60° or more and, more preferably, 80° or more.

With the sixth aspect of the present invention, the pair of mounting surfaces are placed symmetrically with respect to the neutral plane S. However, the pair of mounting surfaces may be deviated in some degree within a permissible range as long as an expected operational effect is obtained. In implementing the other aspect of the present invention, the pair of mounting surfaces may be positively placed in non-symmetric positions. With the pair of mounting surfaces placed symmetrically with respect to the neutral plane S, the sensor-mounting member may have the rest surfaces determined in orientations to allow the direction of the input load F and the neutral plane S to be approximately aligned to each other at, for instance, the intermediate point of the depressing stroke of the operating pedal.

In addition, with a structure configured to allow the direction of the input load F and the neutral plane S to be approximately aligned with each other in the vicinity of a terminal end of the depressing stroke with the input load F being maximized, the resulting maximum input load F can be dispersed to the pair of mounting surfaces in approximately equalized rates. Thus, the orientations of the rest surfaces can be suitably determined.

With the seventh aspect of the present invention, the outer circumferential wall has the pair of parallel wall portions extending parallel to each other, and the pair of mounting wall portions. The parallel wall portions have the other ends, i.e., the other ends opposite to the mounting wall portions, which are connected to each other with the rear wall portion formed in a suitable shape such as a circular arc shape or a curved shape, etc. Forming the rear wall portion in a flat shape perpendicular to the parallel wall portions enables the case member to be formed in an approximately pentagonal home base of a baseball as a whole.

In implementing the other aspect of the present invention, an alternative may be implemented in various modifications and changes. For example, no need necessarily arises for the parallel wall portions to be provided, the rest parts other than the pair of mounting wall portions may be formed into the arc shape, the case member needs not have all of the connecting portion, the outer peripheral wall and the connecting flange, and the outer circumferential wall sufficiently has a partial portion extending toward an inner peripheral area to form a connecting portion.

With the eighth aspect of the present invention, the plural strain detecting elements are mounted on the strain body over the predetermined angular range to be symmetrical with respect to the neutral plane S, for instance, being mounted on the strain body on both sides of the neutral plane S in areas spaced from each other. However, the strain detecting elements may be disposed in areas over the predetermined angular range so as to allow an intersecting point with the neutral plane S to lie on a center position, and a pair of strain detecting elements may be disposed in two positions intersecting the neutral plane S.

In such a case, the strain detecting elements may be preferably disposed in a relatively large angular range involving an entire range of the variable angle β of the direction of the input load F. The plural strain detecting elements disposed in the areas spaced from each other along a direction of the neutral plane S, have no needs to be disposed in angular ranges equal to each other and may have a symmetric relation with respect to the neutral plane S.

In implementing the other aspect of the present invention, no need necessarily arises for the plural strain detecting elements to be disposed symmetrically with respect to the neutral surface S, and a layout pattern of the strain detecting elements can be suitably determined. Even with the seventeenth aspect of the present invention, by determining the symmetric plane G in the same positional relationship as the neutral plane S with respect to the input load F, the strain detecting elements may have layout positions relative to the symmetric plane G in the same manner as that described above.

With the ninth and eighteenth aspects of the present invention, four strain detecting elements in total are disposed on the areas demarcated in four positions, on both sides of the neutral plane S or the symmetric plane G to be spaced from each other symmetrically with respect to the neutral plane S or the symmetric plane G.

In implementing the other aspect of the present invention, the pair of strain detecting elements may be disposed in areas around the axis of the strain body at the approximately same positions as those in which the pair of mounting surfaces are formed symmetrically with respect to the neutral plane S or the symmetric plane G. Merely with such a layout, the operating force and the depressing stroke of the operating pedal can be detected.

With the eleventh and twentieth aspects of the present invention, the strain body is formed in the cylindrical configuration. The axial one end and other end of the cylindrical configuration are fixed to the case member and the shaft-like member, respectively, to be shear-deformed with the relative displacement therebetween. However, a partial area of the cylindrical strain body is sufficiently secured at a position around the centerline thereof to the case member such that the shaft-like member is extended through the interior of the cylindrical configuration of the strain body. In this case, the strain detecting elements detect a tensile strain occurring in the strain body caused by the relative displacement between the case member and the shaft-like member resulting from the reactive force.

In implementing the twelfth and twenty-first aspects of the present invention, the plural plate-like members are disposed in the plural positions symmetrically with respect to, for instance, the neutral plane S or the symmetric plane G. More particularly, four plate-like members in total are disposed in four areas demarcated with, for instance, the neutral plane S or the symmetric plane G and the plane passing across the axis of the shaft-like member in a direction perpendicular thereto, in the symmetric positional relation with respect to the neutral plane S or the symmetric plane G. However, the plural plate-like members may be placed in other modes. Although all of four plate-like members may carry the strain detecting elements, merely parts of the plate-like members sufficiently carry the strain detecting elements.

With the thirteenth aspect of the present invention, the case member is sufficiently integrally fixed to the sensor-mounting member at two fixing-mount portions by the fixing means such as bolts or the like in, for instance, the second aspect of the present invention. This allows the predetermined clearance to be formed between the pair of mounting surfaces and the pair of rest surfaces. In an alternative, the load sensor 204 shown in FIGS. 21A and 21B, may be used intact. In this case, the sensor-mounting hole 202 is formed in a large size to form an allowance over an entire circumference with the positioning flange 208d partially protruding to form the two fixing-mount portions at the two predetermined positions, which are integrally fixed to the sensor-mounting member (operating pedal 16) by bolts or the like. That is, the sensor-mounting hole and the case member may have the forms of any shapes, provided that a predetermined clearance is formed between the sensor-mounting hole and the case member.

With the thirteenth aspect of the present invention, the two fixing-mount portions may be provided on the case member in two areas around the axis of the shaft-like member at positions in which the case member is pressed against the sensor-mounting member in response to the applied input load F. This positions are downstream positions in the direction of the input load F, like the arrangement of the mounting surfaces and the rest surfaces in, for instance, the second aspect of the present invention. However, the two fixing-mount portions may be provided on the case member at areas opposite to the downstream areas, i.e., at upstream areas of the direction of the input load F.

With the fourteenth aspect of the present invention, the screw members may be used as the fixing means. However, various other fixing means may also be adopted including a spot welding or the like through which the case member is integrally fixed to the sensor-mounting member.

BRIEF DESCRIPTION OF THE DRAWINGS

FIG. 1A shows a state with an operating pedal placed at an intermediate point of a depressing stroke, and FIG. 1B shows another state with the operating pedal placed at a terminal end point of the depressing stroke.

FIG. 3A is the longitudinal cross sectional view of the pivotably connecting section cut on a neutral plane S, and FIG. 3B is the cross sectional view taken on line IIIA-IIIA of FIG. 3A.

FIG. 4A is the longitudinal cross sectional view of the pivotably connecting section cut on the neutral plane S, and FIG. 3B is the cross sectional view taken on line IVA-IVA of FIG. 4A.

FIGS. 7A and 7B are front views and FIGS. 7C and 7D are cross sectional views.

FIG. 8A shows the load sensor with the depressing stroke laying at the intermediate point, and FIG. 8B shows the load sensor in a further depressed state.

FIGS. 9A and 9B correspond to FIGS. 1A and 1B, respectively.

FIG. 12A is a development view, corresponding to FIG. 5C, which shows the strain detecting elements mounted on an outer circumferential surface of a strain body and FIG. 12B is a circuit diagram corresponding to FIG. 6.

FIG. 13A is a longitudinal cross sectional view of the load sensor cut on the neutral plane S and FIG. 13B is a cross section taken on line XIIIA-XIIIA of FIG. 13A.

FIG. 14A is a longitudinal cross sectional view of the load sensor cut on the neutral plane S, and FIG. 14B is a cross section taken on line XIVA-XIVA of FIG. 14A.

FIG. 15A is a front view corresponding to FIG. 2A, and FIG. 15B is a perspective view showing a shaft-like member and a plate-like member.

FIG. 18A is a perspective view of the load sensor showing a vicinity of a sensor-mounting area, and FIG. 18B is an enlarged cross sectional view taken on line XVIIIA-XVIIIA of FIG. 18A.

FIGS. 19A and 19B are illustrative views showing the load sensor shown in FIGS. 18A, and 18B. FIG. 19A is a plan view of the load sensor as viewed from an upper area in FIG. 18B and FIG. 19B is a bottom view of the load sensor as viewed from a lower area in opposition.

FIG. 20A shows a state in which a mounting posture of the case member is displaced, and FIG. 20B shows another state in which a deviated abutting engagement occurs due to a dimensional error of a configuration.

FIG. 21A is a front view of a load-sensor-equipped vehicle operating pedal device, and FIG. 21B is a cross sectional view taken on line XXIA-XXIA of FIG. 21A in an enlarged scale.

FIGS. 22A and 22C show the load sensor in an unloaded state, and FIGS. 22B and 22D show the load sensor in a loaded state. FIGS. 22A and 22B are front views and FIGS. 22C and 22D are cross-sectional views.

FIG. 23A shows the load sensor in a state at an intermediate point of a depressing stroke and FIG. 23B shows the load sensor in a further depressed state.

DETAILED DESCRIPTION OF THE PREFERRED EMBODIMENTS

Now, various embodiments of the present invention will be described below in detail with reference to the accompanying drawings.

Embodiment 1

Figure 1A:
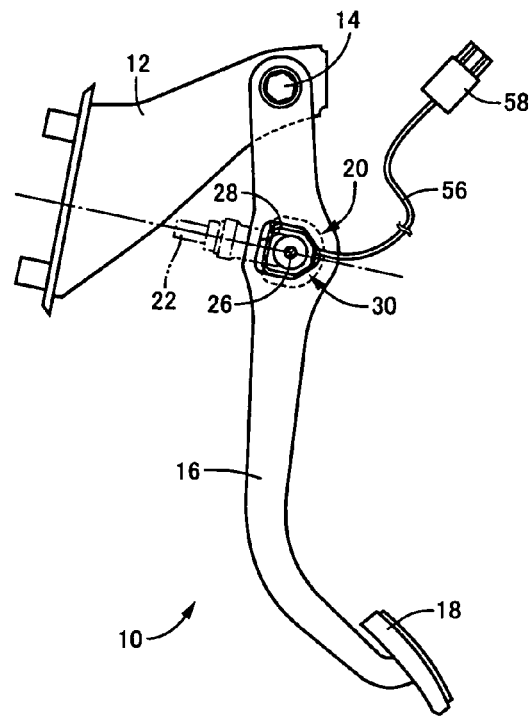
FIGS. 1A and 1B are front views showing one embodiment of a vehicle operating pedal device for use in a service brake to which the present invention is applied.
Figure 1B:
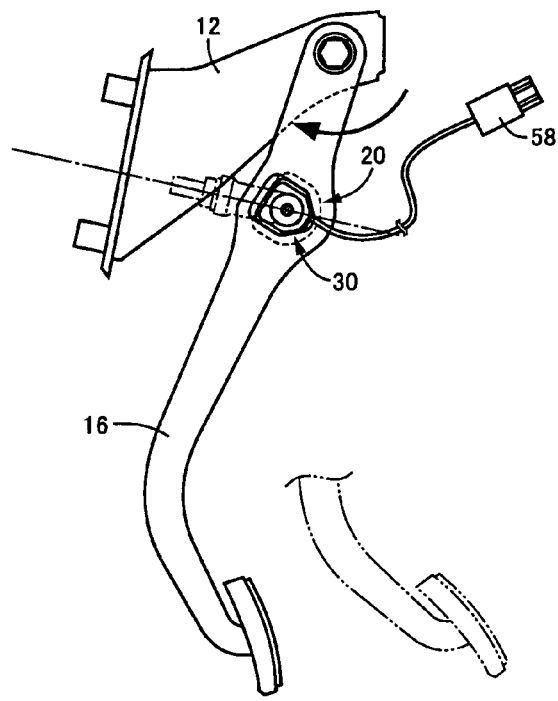
Figure 21A:
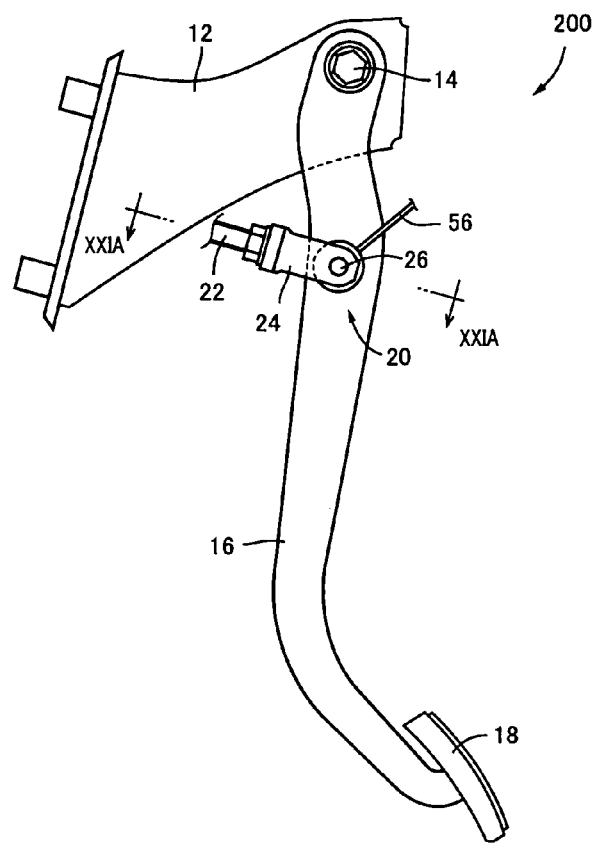
FIGS. 21A and 21B are illustrative views for illustrating a background of the art of the present invention.
Figure 21B:
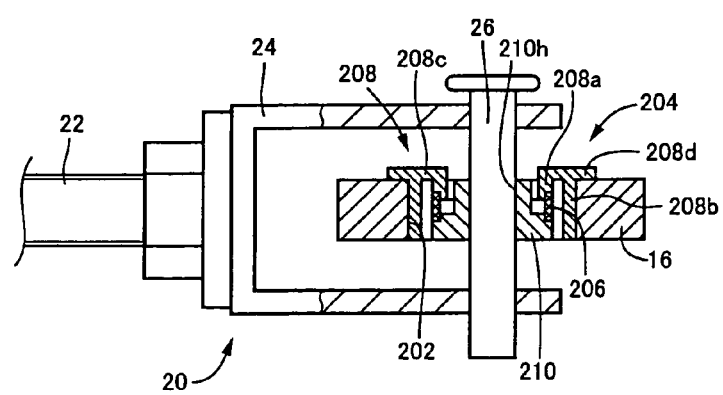

FIGS. 1A and the 1B are views showing an operating pedal device 10 of one embodiment according to the present invention for a service vehicle brake. FIG. 1A shows an operating pedal 16 in a state depressed to an intermediate point of a depressing stroke, and FIG. 1B shows another state of the operating pedal 16 that is further depressed to a terminal end of the depressing stroke. The vehicle operating pedal device 10 represents a case in which the present invention is applied to the operating pedal device 200 shown in FIGS. 21A and the 21B. The operating pedal 16 is formed a sensor-mounting hole 28 for mounting a load sensor 30 therein.

Like the load sensor 204 described above, the load sensor 30 has the wire harness 56 having a distal end coupled to a connector 58, through which the wire harness 56 is connected to a control circuit section of a vehicle. The operating pedal device 10 corresponds to a claimed operating device, and the operating pedal 16 corresponds to a claimed sensor-mounting member.

Figure 2:
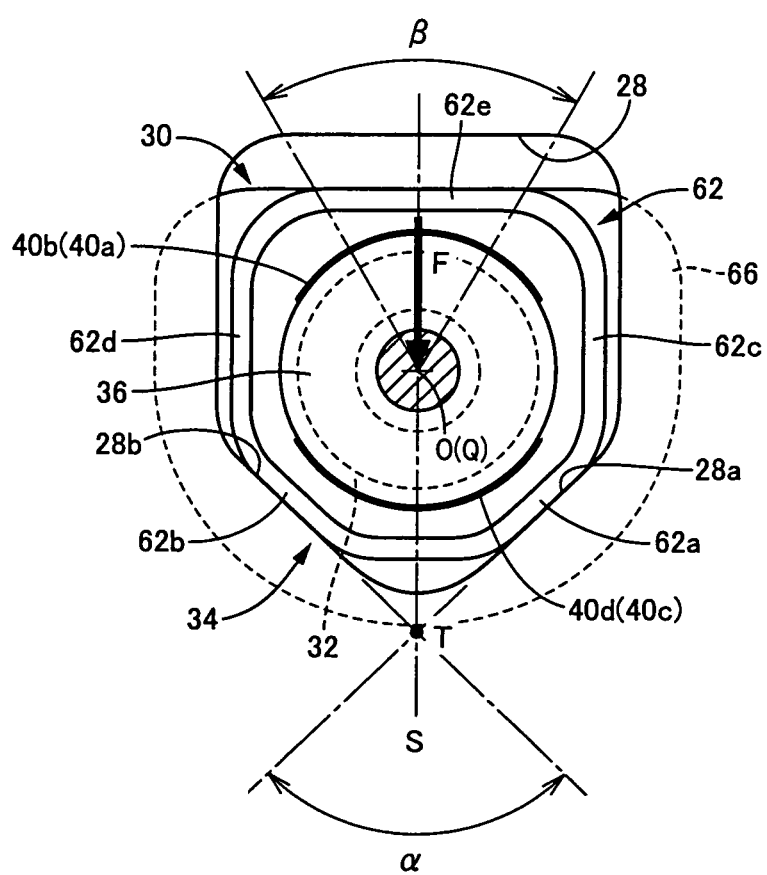
FIG. 2 is a front view showing a load sensor of the embodiment, shown in FIGS. 1A and 1B, in an exaggerated form.
Figure 3A:
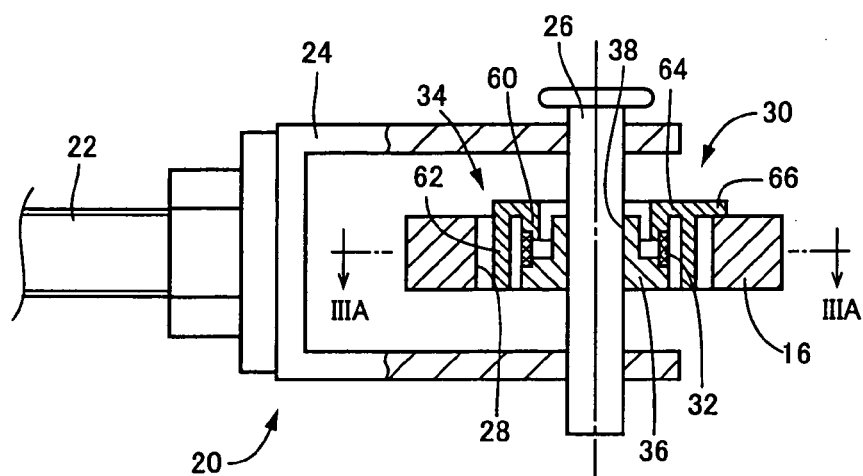
FIGS. 3A and 3B are cross sectional views showing a pivotably connecting section forming part of the embodiment shown in FIGS. 1A and 1B.
Figure 3B:
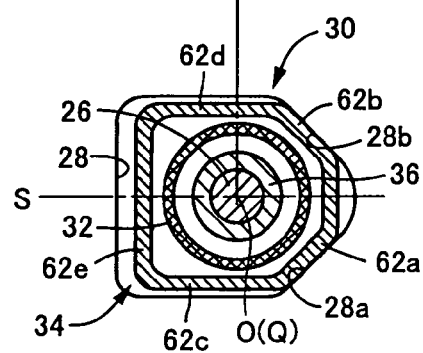

FIG. 2 and FIGS. 3A and 3B are views showing the load sensor 30 of the present embodiment and the sensor-mounting hole 28 in detailed structures. FIG. 2 is an enlarged front view corresponding to the structure of FIGS. 1A and 1B, that is, a view of a structure as viewed from a lower area in FIG. 3A. FIG. 3A is a cross sectional view of the operating pedal cut on a neutral plane S in FIG. 2, and FIG. 3B is a cross sectional view taken on line IIIA-IIIA of FIG. 3A. The load sensor 30 includes a cylindrical strain body 32, an annular case member 34 mounted on the strain body 32 at an outer circumferential area thereof, and the shaft-like member 36 disposed inside the strain body 32 for detecting a load radially applied to the strain body 32.

The case member 34 includes a connecting portion 60, an outer circumferential wall 62, a connecting flange 64 and a positioning flange 66, which are formed in a double-cylinder structure as a whole. That is, one axial end (an upper distal end of the strain body 32 as viewed in FIG. 3A) of the strain body 32 is integrally fixed to the connecting portion 60, placed in an inner circumferential area, by press fitting or welding or the like. The outer circumferential wall 62 extends in an outer peripheral area so as to surround the connecting portion 60. The connecting flange 64 formed in a plate-like shape connects the connecting portion 60 and the outer circumferential wall 62 thereof integrally with each other. The positioning flange 66 is formed in a structure continuous with the connecting flange 64 so as to protrude radially outward to an area remote from the outer circumferential wall 62.

When the outer circumferential wall 62 is fitted to the sensor-mounting hole 28 with the positioning flange 66 placed in abutting engagement with the operating pedal 16 one sidewall thereof, the outer circumferential wall 62 is partly pressed against an inner wall surface of the sensor-mounting hole 28 by fixing means such as a leaf spring or the like (not shown). Thus, the case member 34 can be retained on the operating pedal 16 in a fixed posture so as not to disengage therefrom.

The shaft-like member 36 integrally retains the other axial end (a lower end portion as viewed in FIG. 3A) of the strain body 32 by press fitting or welding or the like, and has an insertion bore 38 formed along an axis area to which a clevis pin 26 is inserted. The clevis pin 26, the insertion bore 38 and the clevis 24 are rotatable relative to each other to cause the relevant elements of lessened friction to rotate relative to each other in accordance with depression of the operating pedal 16. For the friction to be alleviated, bearings, bushes or the like can be intervened depending on needs.

Now, description is made of a case where the input load "F" is externally applied to the case member 34 and the shaft-like member 36, connected to each other via the strain body 32 in such a way mentioned above, in a radial direction i.e. in a direction perpendicular to the centerline "O".

When the applied input load "F" is zero, the axes "Q" of the shaft-like member 36 and the clevis pin 26 are kept under a condition to be approximately concentric with the center line "O" of the load sensor 30 with the strain body 32 maintained in a hollow cylindrical shape over a full length with the center aligned on the center line "O" as shown in FIG. 2 and FIGS. 3A and the 3B. The centerline "O" of the load sensor 30 represents a centerline of the case member 34 integrally mounted on the operating pedal 16, and more particularly, represents a centerline of the cylindrical connecting portion 60.

Meanwhile, the load "F" is radially applied to between the case member 34 and the shaft-like member 36 due to a reactive force of the operating rod 22 in accordance with depression of the operating pedal 16. Then, the case member 34 associated with the operating pedal 16, displaces relative to the shaft-like member 36 in a direction (leftward as viewed in FIGS. 3A and the 3B) to be closer to the operating rod 22, causing the strain body 32 to shear-deformed as shown in FIGS. 4A and the 4B.

Here, an annular space is provided between the case member 34 and the shaft-like member 36 to permit both of these component parts to be displaced relative to each other in a radial direction while permitting the strain body 32 to be shear-deformed. In addition, the strain body 32 is made of metallic material such as ferritic stainless steel or the like that is elastically deformable upon receipt of the load acting in the radial direction. Accordingly, with the operating pedal 16 being progressively depressed, an operating force is generated to cause the strain body 32 to be shear-deformed.

Figure 4A:
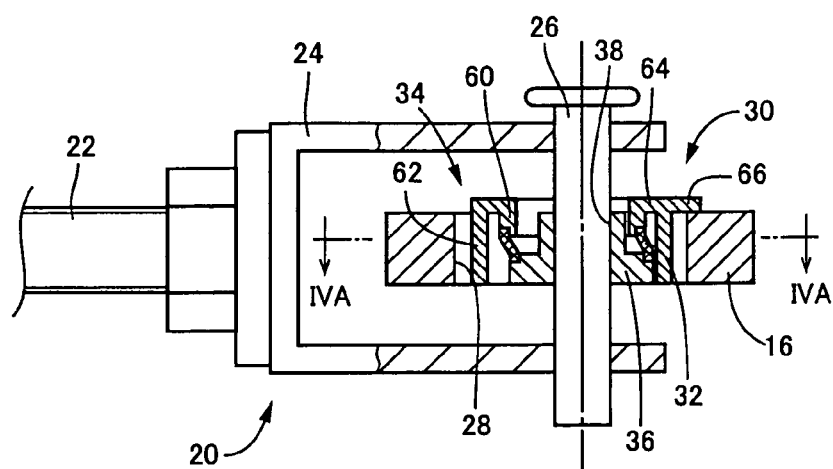
FIGS. 4A and 4B are cross sectional views showing a strain body, remaining under the state shown in FIGS. 3A and 3B, which is applied with an input load F to be shear-deformed.
Figure 4B:
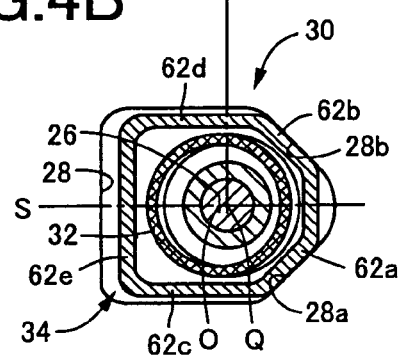

FIGS. 4A and the 4B are views corresponding to FIGS. 3A and 3B, respectively, with FIG. 4B being a cross section taken on line IVA-IVA of FIG. 4A. Actually, the strain body 32 encounters an extremely small deformation amount with almost no adverse affect on a depressing stroke of the operating pedal 16. However, the deformation amount is shown in an exaggerated manner in the FIGS. 4A and 4B for easier understanding. This situation is true in the following drawings.

Figure 5A:
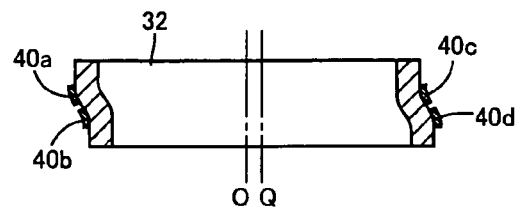
FIG. 5A is a cross sectional view showing the strain body in an enlarged scale in FIG. 4A.
Figure 5B:
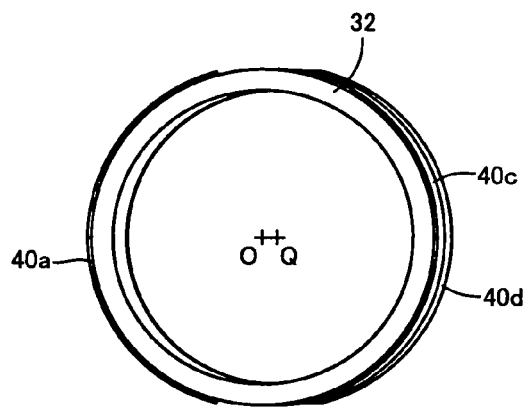
FIG. 5B is a plan view of the strain body as viewed from an upper area in FIG. 5A.
Figure 5C:
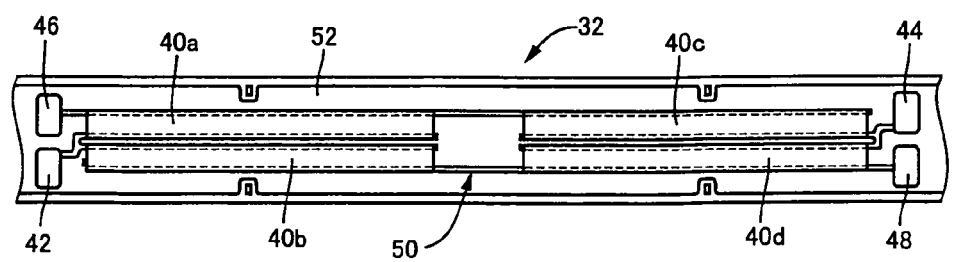
FIG. 5C is a development view of the strain body for illustrating strain detecting elements mounted on its outer circumferential surface.

In order to detect a shear strain occurring in the strain body 32, four strain-resistance elements 40a to 40d are mounted on an outer circumferential surface thereof as strain detecting elements as shown in FIGS. 5A and the 5B. Examples of the strain-resistance elements 40a to 40d may preferably include, for instance, semiconductor strain gauges of a thin film type or a thick film type and commonly used strain gauges, etc. FIG. 5A shows a state corresponding to the state shown in FIG. 4A, in which the strain body 32 is sear-deformed; FIG. 5B is a plan view showing the strain body 32 as viewed from an upper area in FIG. 5A; and FIG. 5C is a development view showing an outer circumferential surface of the strain body 32.

The four strain-resistance elements 40a to 40d are mounted on the strain body 32 in two symmetric areas, sandwiching the center line "O" (Q) along directions causing the strain body 32 to be shear-deformed upon receipt of an external load. In each of the two symmetric areas, the two strain-resistance elements are placed at spaced positions so that the shear strains of the strain-resistance elements 40a to 40d generate tensile deformation or compression deformation of strain body 32 in the axial direction.

Figure 6:
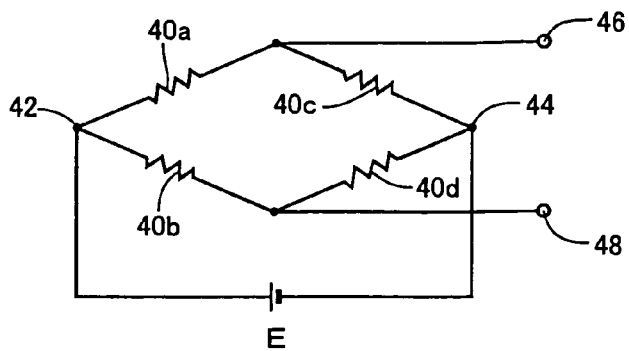
FIG. 6 is a circuit diagram showing a bridge circuit in which the strain detecting elements shown in FIG. 5C are connected in an electrically conductive circuit pattern.

Connecting the four strain-resistance elements 40a to 40d in an electrically conductive pattern 50 (see FIG. 5C) results in the formation of a bridge circuit as shown in FIG. 6. The electrically conductive pattern 50 has an electric power supply electrode 42 and the GND (Ground) electrode 44, between which an electric power supply E is connected. An electrical signal is output from a pair of output electrodes 46 and 48 at an amount or value depending on a level of strain. For connecting the electric power supply E to the electric power supply electrode 42, and for taking out an electrical signal output from the output electrodes 46 and 48, the wire harness 56 (see FIG. 1) is connected to the electrodes, which extends from the load sensor 30 to be connected to the control circuit section of the vehicle via the connector 58.

The outer circumferential surface of the strain body 32 is preliminarily formed with an insulating film 52 (see FIG. 5C) such as glass paste or the like, on which the electrically conductive circuit pattern 50 is formed using electrically conductive material such as silver or the like. Further, the strain-resistance elements 40a to 40d are integrally formed by sintering on the insulating film 52 in electrical connection in part to the electrically conductive circuit pattern 50. Moreover, a control circuit section may be located in an area inside the load sensor 30.

In the illustrated embodiment, a full-bridge circuit is employed. However, when a strain body is used for instance with a structure having only a partial area bearing a load based on the operating force of the operating pedal 16 is formed in an arc shape, a half bridge circuit may be employed.

As the operating pedal 16 is pivoted about the support shaft 14 in accordance with depression, both the operating rod 22 and the operating pedal 16 are also pivoted relative to each other about the axis of the clevis pin 26. Thus, the input load "F" applied to the load sensor 30 from the clevis pin 26, varies in direction with a resultant variation in position at which the strain body 32 is deformed.

The strain-resistance elements 40a to 40d are determined in size and layout position or the like so as to obtain approximately fixed detecting performance regardless of the directional variation of the input load "F". That is, the strain-resistance elements have lengthwise dimensions covering a predetermined angular range greater than a variable angle $\beta$ (see FIG. 2) in a direction of the input load "F" along a circumferential direction of the strain body 32 while having a symmetric configuration with respect to the neutral plane S.

The neutral plane "S" is a plane, involving the centerline "O" of the load sensor 30, which is determined such that the input load "F" is approximately coincident with the neutral plane "S" at an intermediate point of a depressing stroke. The input load F varies from an initial state acting in one direction on left and right sides of the neutral plane S in an area around the centerline "O" and passes across the neutral plane S in variation to another state acting in opposite direction.

The outer circumferential wall 62 of the case member 34 has a pair of flat mounting wall portions 62a and 62b converged with each other at a predetermined apex angle $\alpha$ to define a convex profile as a V-shaped profile in flat surfaces perpendicular to the axis Q of the shaft member 36, in FIG. 2 and FIG. 3B. The mounting wall portions 62a and 62b have outer sidewalls that function as mounting surfaces. The sensor mounting hole 28 has a pair of flat rest surfaces 28a and 28b converged with each other into a V-shaped profile at the same concave profile as the apex angle $\alpha$ of the mounting wall portions 62a and 62b.

The case member 34 is mounted in the sensor-mounting hole 28 to be positioned therein in a fixed posture with a state depressed downward, as viewed in FIG. 2, by means of fixing means such as the leaf spring or the like so as to cause the pair of flat mounting wall portions 62a and 62b to be surface contacted with the pair of flat rest surfaces 28a and 28b, respectively. FIG. 2 is a view showing the load sensor 30, as viewed from a front side which is opposite side to that shown in FIG. 3B, which is shown to be opposite on right and the left in positions of the flat mounting wall portions 62a and 62b with respect to the neutral plane "S". The flat mounting wall portions 62a and 62b correspond to a claimed mounting section, and the flat rest surfaces 28a and 28b correspond to the claimed load receiving portions.

The orientations and the apex angle $\alpha$ of the rest surfaces 28a and 28b of the sensor-mounting hole 28 are determined such that even if the direction of the input load F is varied within a range of the variable angle $\beta$ with the operating pedal 16 being depressed, the pair of mounting wall portions 62a and 62b are pressed against the rest surfaces 28a and 28b in response to the input load F at all times. In particular, the orientations and the apex angle $\alpha$ of the rest surfaces 28a and 28b are always determined so as to create component forces oriented toward an apex point T of the convex profile with reactive forces applied to the pair of mounting wall portions 62a and 62b from the rest surfaces 28a and 28b.

The neutral surface S is a plane involving the apex point T and the axis Q, i.e., the centerline O, of the shaft-like member 36 under an unloaded condition. The pair of mounting wall portions 62a and 62b are provided symmetrically with respect to the neutral plane S. The apex angle $\beta$ is determined to be smaller angle than an angle of $(180°-\beta)$ for the direction of the variable angle $\beta$ of the input load F. Thus, eve if the input load F is varied in direction within the range of the variable angle $\beta$, the input load F is always born with the rest surfaces 28a and 28b via the pair of mounting wall portions 62a and 62b. In addition, the apex angle $\alpha$ is determined to lie at an angle greater than, for instance, 80° because if the apex angle $\alpha$ is too small, the component forces oriented toward the apex point T increase with a possibility of the occurrence of flexure deformation.

The outer circumferential wall 62 further has a pair of parallel wall portions 62c and 62d and a flat-plate-like rear wall segment 62e formed in an approximately pentagonal shape like a home base configuration of a baseball as a whole. The pair of parallel wall portions 62c and 62d is continuous with the pair of mounting wall portions 62a and 62b in parallel to the neutral plane S symmetrically with respect to the neutral plane S. The rear wall segment 62e has both ends connected to the parallel wall portions 62c and 62d at the other ends thereof at a right angle opposite to the mounting wall portions 62a and 62b such that the parallel wall portions

62c and 62d are integrally connected to each other. This allows the outer circumferential wall 62 to be maintained in a thin wall thickness and lightweight, while providing increased rigidity with lessened deformation occurring with the input load F.

The rest surfaces 28a and 28b of the sensor-mounting hole 28 of the operating pedal 16 are brought into surface contact with the mounting wall portions 62a and 62b of the outer circumferential wall 62, with the remnants of the sensor-mounting hole 28 and the outer circumferential wall 62 being set to provide a predetermined clearance. This causes the mounting wall portions 62a and 62b to be reliably held in surface contact with the rest surfaces 28a and 28b, thereby permitting only the mounting wall portions 62a and 62b to bear the input load F.

With the vehicle operating pedal device 10 of such a structure, the load sensor 30, electrically detecting the operating force depending on a relative displacement between the case member 34 and the shaft-like member 36, is mounted in the pivotably connecting section 20 through which the operating pedal 16 and the operating rod 22 are connected to be pivotable relative to each other. The load sensor 30 detects the operating force transmitted through the clevis pin 26 of the pivotably connecting section 20. The operating pedal 16 and the operating rod 22 correspond to a pair of component members in the first embodiment.

The load sensor 30 is mounted in the sensor-mounting hole 28 formed in the operating pedal 16. Thus, the vehicle operating pedal device 10 can be formed in a simple and compact structure as a whole without causing any adverse affect on mounting conditions of the conventional pedal device. In addition, the vehicle operating pedal device 10 can employ the same peripheral members, such as the operating rod 22, the clevis 24 and the clevis pin 26 or the like, as those of the conventional pedal device, enabling the device to be structured at low cost.

The case member 34 of the load sensor 30 has the pair of flat mounting wall portions 62a and 62b converged at the predetermined apex angle α to form the convex profile. Outer sidewalls of the flat mounting wall portions 62a and 62b are surface-contacted with the pair of the flat rest surfaces 28a and 28b formed in the sensor-mounting hole 28, respectively, to be positioned in a fixed posture. In addition, even if the input load F transmitted to the case member 34 from the shaft-like member 36 through the strain body 32 varies in direction due to the depressing operation of the operating pedal 16, the input load F is always born with the pair of rest surfaces 28a and 28b via the pair of mounting wall portions 62a and 62b.

Such a structure minimizes the occurrence of flexural deformation of the case member 34 due to stress concentration. This prevents undesired deformation of the strain body 32 caused by the flexural deformation of the case member 34, or prevents a reduction in deformation amount (strain value) of the strain body 32. As a result, the strain body 32 can have improved precision in detecting the operating force, while enabling the device to be formed in a structure with lightweight at low cost, in contrast to a case in which high-strength member with lessened flexural deformation or a case member of a large size is adopted.

Even if the input load F varies in direction with the depressive operation of the operating pedal 16, the input load F is always born with the pair of rest surfaces 28a and 28b via the pair of mounting wall portions 62a and 62b. Therefore, the load sensor 30 can be maintained in the fixed position and posture with no fear of the occurrence of oscillating displacement with resultant degraded detecting precision of the operating force, in contrast to a case in which a cylindrical case member is employed.

Further, due to the reduction in flexural displacement of the case member 34, even if the input load F varies in direction, the strain body 32 merely varies in deforming position and no deforming pattern is complicated with a minimized variation in deformation amount. Thus, with the input load F being fixed, the strain resistance elements 40a to 40d have average strain values that are approximately fixed. Thus, even if the pedal is actually actuated to progressively increase the input load F, the detecting precision is stabilized with increased reliability.

The orientations and the apex angle α of the rest surfaces 28a and 28b are determined so as to allow the pair of mounting wall portions 62a and 62b to always generate the component forces oriented toward the apex point T of the convex profile, in response to the reactive forces applied from the rest surfaces 28a and 28b, regardless of the directional variation of the input load F in accordance with depression of the operating pedal 16. This avoids the relative movements of the mounting wall portions 62a and 62b and the rest surfaces 28a and 28b independently of frictional forces occurring therebetween. This always results in bearing of the input load F by the pair of rest surfaces 28a and 28b via the pair of mounting wall portions 62a and 62b. As a result, this further reliably prevents a positional deviation and a posture variation of the load sensor 30, resulting in improved detecting precision.

The apex angle α is determined to be smaller than the angle of (180°-β) for the variable angle β of the direction of the input load F. This prevents the associated portions from moving relative to each other independently of the frictional forces occurring between the mounting wall portions 62a and 62b and the rest surfaces 28a and 28b. Thus, the input load F can be always born with the pair of rest surfaces 28a and 28b via the pair of mounting wall portions 62a and 62b. Even in this respect, the positional deviation and the posture variation of the load sensor 30 can be further reliably prevented, resulting in improved detecting precision.

The case member 34 of the load sensor 30 is sufficiently placed so as to allow the pair of mounting surfaces i.e. the mounting wall portions 62a and 62b to be brought into engagement with the pair of rest surfaces 28a and 28b, respectively, thereby providing improved assembling possibility of the load sensor 30. In addition, concerning about the case member 34 assembled to the operating pedal 16, no rest of the case member 34 except for the mounting wall portions 62a and 62b and the rest surfaces 28a and 28b is necessarily required to have high dimensional precision. This alleviates required precision or the like of the part shape, resulting in a reduction in manufacturing cost.

The pair of mounting wall portions 62a and 62b of the case member 34 is formed symmetrically with respect to the neutral plane S. Therefore, the orientations of the pair of rest surfaces 28a and 28b can be easily designed, which always bear the input load F varying in direction in accordance with depression of the operating pedal 16 via the pair of mounting wall portions 62a and 62b.

In the illustrated embodiment, the rest surfaces 28a and 28b are oriented such that the direction of the input load F and the neutral plane S approximately coincide with each other at an intermediate point of a depressing stroke of the operating pedal 16. Therefore, the direction of the input load F is varied in a pattern approximately symmetrical to the center of the neutral plane S. Thus, with the apex angle α being properly determined, the input load F can be always born appropriately with the pair of rest surfaces 28a and 28b via the pair of mounting wall portions 62a and 62b regardless of the directional variation of the input load F.

The case member 34 has the double-layered cylindrical structure having the connecting portion 60, the outer circumferential wall 62 and the connecting flange 64. Among these, the pair of mounting wall portions 62a and 62b are formed on the outer circumferential wall 62. Therefore, the case member 34 can be formed in a lightweight and low price. In contrast, the pair of mounting wall portions 62a and 62b are liable to easily yield in deformation due to the input load F. In the illustrated embodiment, however, the pair of parallel wall portions 62c and 62d are formed to be continuous with the pair of mounting wall portions 62a and 62b. This allows the outer circumferential wall 62 to have increased rigidity, thereby appropriately preventing the flexure deformations of the mounting wall portions 62a and 62b.

The clearance is provided between the rest of the outer circumferential wall 62, excepting the pair of mounting wall portions 62a and 62b, and the sensor-mounting hole 28. Therefore, the case member 34 can be easily located in the sensor-mounting hole 28 of the case member 34 such that the outer side surfaces, i.e., the mounting surfaces of the mounting wall portions 62a and 62b are reliably brought into surface contact with the pair of rest surfaces 28a and 28b of the sensor-mounting hole 28. This allows the input load F to be born with only the mounting wall portions 62a and 62b, thereby reliably obtaining high detecting precision.

In the illustrated embodiment, the strain body 32 has the hollow cylindrical shape in concentric relation to the shaft-like member 36. The four strain resistance elements 40a to 40d are placed on the outer circumferential surface of the strain body 32 over a predetermined angular range while straddling the neutral plane S to be symmetrical with each other with respect to the neutral plane S. Therefore, the operating force can be reliably detected with a bridge circuit.

The load sensor 30 is mounted on the operating pedal 16 serving as the sensor-mounting member connected to the operating rod 22 to be pivotable relative thereto about the axis of the clevis pin 26. This allows the load sensor 30 to detect the operating force (output) transmitted from the clevis pin 26 to the operating rod 22 on a final stage, detecting a braking force generated depending on the output of the operating rod 22 with high precision.

The case member 34 is located in the sensor-mounting hole 28 formed in the operating pedal 16 under which the clevis 24 retains both axial ends of the clevis pin 26 protruding through the sensor-mounting hole 28 to both sides thereof while passing along the axis Q of the shaft-like member 36. Thus, no rotation moment, such as torsion or the like, acts on the load sensor 30, detecting the operating force with further increased precision.

Figure 7A:
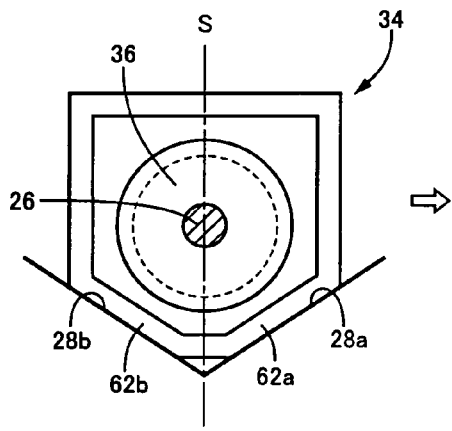
FIGS. 7A to 7D are illustrative views for illustrating the operation of the load sensor of the embodiment shown in FIGS. 1A and 1B. Each of FIGS. 7A and 7C shows the load sensor under an unloaded state, and each of FIGS. 7B and 7D shows the load sensor under a state applied with the input load.
Figure 7B:
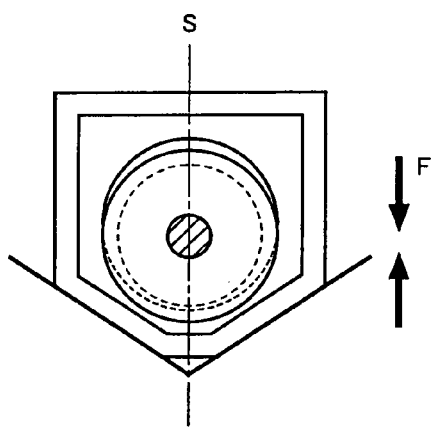
Figure 7C:
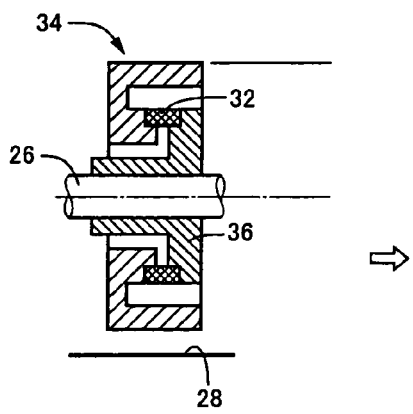
Figure 7D:
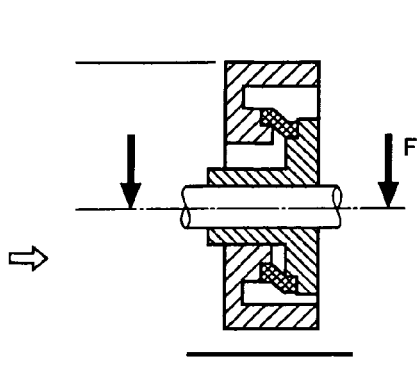
Figure 22A:
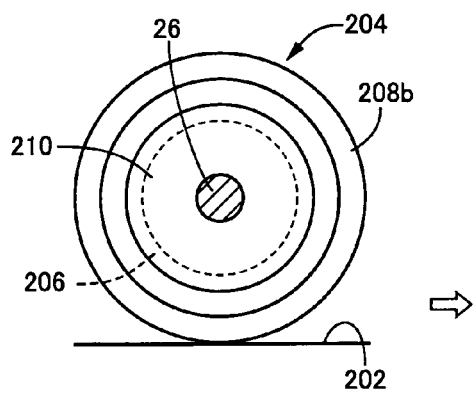
FIGS. 22A to 22D are illustrative views for illustrating the operation of the load sensor shown in FIGS. 21A and 21B.
Figure 22B:
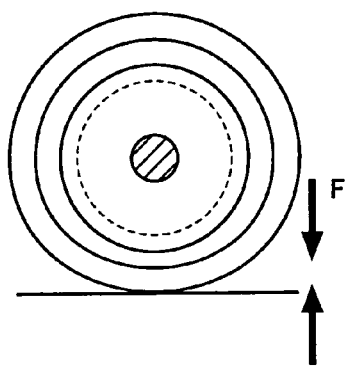
Figure 22C:
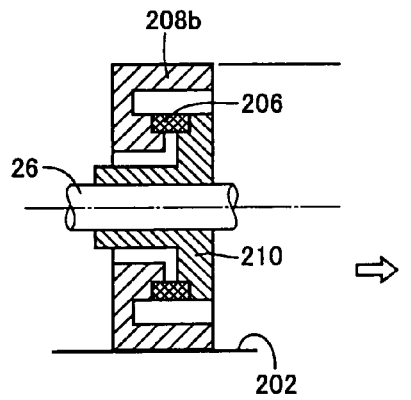
Figure 22D:
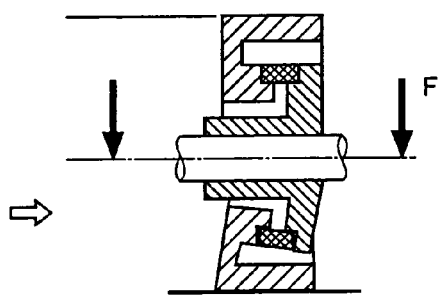
Figure 23A:
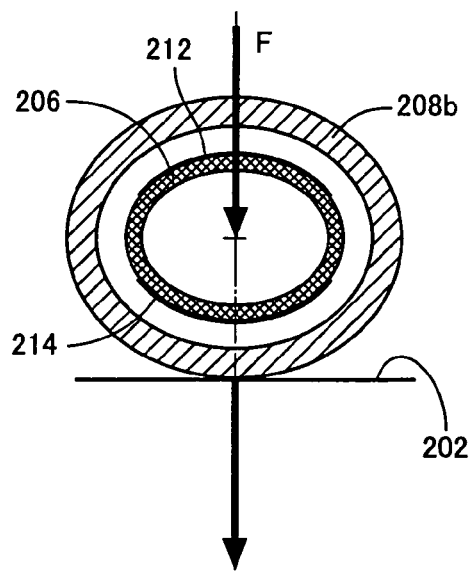
FIGS. 23A and 23B are illustrative views for illustrating a transfer state of a force in the load sensor shown in FIGS. 21A and 21B.
Figure 23B:
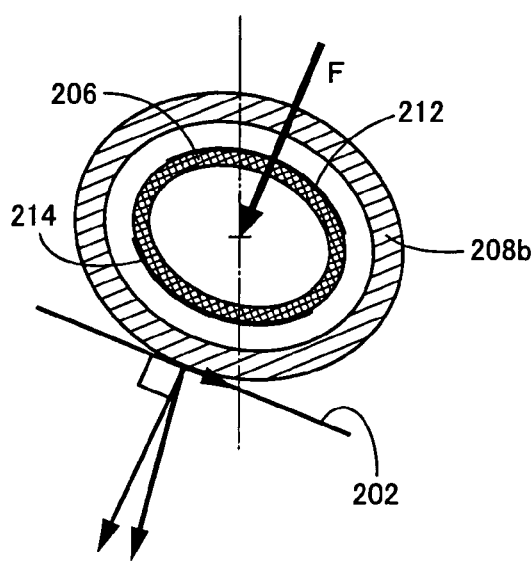

FIGS. 7A and the 7B are views, corresponding to FIGS. 22A AND 22B, which show the load sensor 30 with a depressing stroke at an intermediate point. FIG. 7A shows an unloaded state and FIG. 7B shows a loaded state applied with a predetermined input load F. The input load F is born with the pair of rest surfaces 28a and 28b via the pair of mounting wall portions 62a and 62b. This prevents the occurrence of stress concentration that would occur in the structure shown in FIGS. 22A and the 22B, thereby suppressing the occurrence of flexure deformation of the case member 34 caused by resulting stress concentration. As a result, the input load F, i.e., the operating force can be detected with high precision.

Figure 8A:
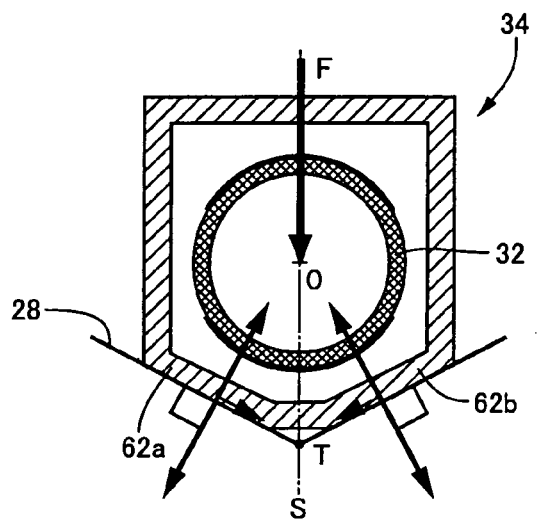
FIGS. 8A and 8B are illustrative views for illustrating a transfer state of a force applied to the load sensor of the embodiment shown in FIGS. 1A and 1B.

FIGS. 8A and the 8B are views showing force transmitting conditions when applied with the input load F. FIG. 8A represents a state with the depressing stroke at the same intermediate point as that shown in FIG. 7B. The mounting wall portions 62a and 62b generate a pair of component forces with the same magnitudes in directions oriented toward the apex point T of the convex profile when subjected to the reactive forces applied from the rest surfaces 28a and 28b. This cause the load sensor 30 to be reliably positioned on the pair of rest surfaces 28a and 28b with no occurrence of positional displacement and posture variation.

Figure 8B:
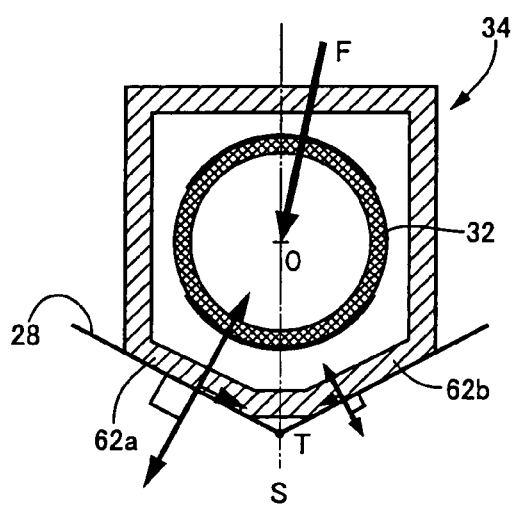

As the operating pedal 16 is further progressively depressed under such a condition, the input load F varies in direction with a state shown in FIG. 8B. However, the mounting wall portions 62a and 62b still remain operative to generate the component forces in direction oriented toward the apex point T of the convex profile due to the reactive forces applied from the rest surfaces 28a and 28b. Thus, the positional displacement and posture variation of the load sensor 30 can be prevented. In addition, due to the minimized flexure deformation of the case member 34, even upon directional variation of the input load F, the deforming position of the strain body 32 varies, merely varying burden loads of the pair of parallel wall portions 62c and 62d. That is, no deforming pattern is complicated, rendering high detecting precision stably. FIGS. 8A and the 8B are cross sectional views as viewed from a rear side, in contrast to the views shown in FIGS. 7A and 7B on upper areas thereof, which represent the mounting wall portions 62a and 62b in reversed positions on right and left.

Next, another embodiment of the present invention will be described below. In the following description, the members and the portions common to those of the embodiment described above bear like reference numerals to omit detailed redundant description.

Embodiment 2

Figure 9A:
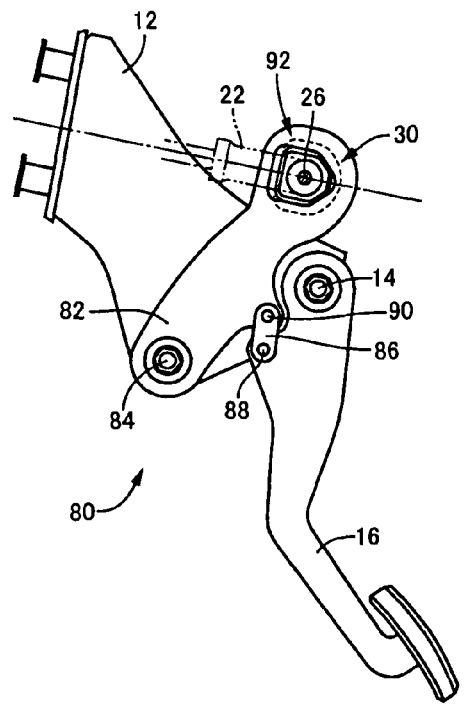
FIGS. 9A and 9B are illustrative views for illustrating a case in which the present invention is applied to a vehicle operating pedal device having an intermediate lever.
Figure 9B:
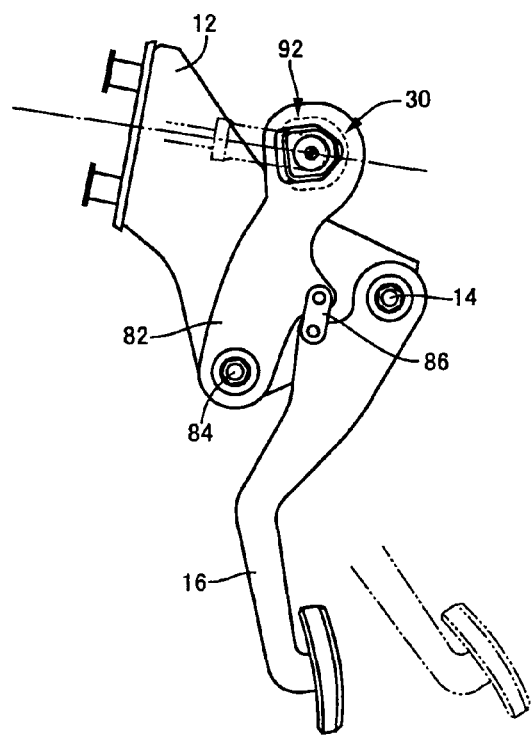

FIGS. 9A and the 9B are views corresponding to FIGS. 1A and 1B. FIG. 9A shows a state with a depressing stroke placed at an intermediate point thereof, and FIG. 9B shows another state with the depressing stroke placed at a final stage thereof. A vehicle operating pedal device 80 includes an intermediate lever 82, through which the operating force is transmitted from the operating pedal 16 to the operating rod 22.

The intermediate lever 82 has one longitudinal end pivotably mounted on the pedal support 12 by means of a support pin 84 extending parallel to the support shaft 14, and a longitudinally intermediate portion pivotably connected to the operating pedal 16 via a connecting link 86. This allows the intermediate lever 82 to be pivoted about the support pin 84 mechanically in conjunction with depression of the operating pedal 16. The connecting link 86, has both longitudinal ends pivotably relatively connected to the operating pedal 16, and the intermediate lever 82 via a pair of connecting pins 88 and 90, respectively, which extend parallel to the support shaft 14.

The operating rod 22 is connected to the intermediate lever 82 at a distal end, i.e., a longitudinal end thereof via a pivotably connecting section 92. The intermediate lever 82 and the operating rod 22 correspond to a pair of component members in the second embodiment. The pivotably connecting section 92 has the same structure as that of the pivotably connecting section 20 with the load sensor 30 being mounted in the sensor-mounting hole formed in the intermediate lever 82. Accordingly, the second embodiment renders the same advantageous effects as those of the first embodiment.

Further, the load sensor 30 may be mounted in one of pivotably connecting sections with structures as described below for detecting the operating force. With a first pivotably connecting section, the connecting link 86 may be connected to the operating pedal 16 to be pivotable relative thereto via the connecting pin 88. With a second pivotably connecting section, the connecting link 86 may be connected to the intermediate lever 82 to be pivotable relative thereto via the connecting pin 90. With a third pivotably connecting section, the intermediate lever 82 may be connected to the pedal support 12 to be pivotable relative thereto via the support pin 84.

Embodiment 3

Figure 10:
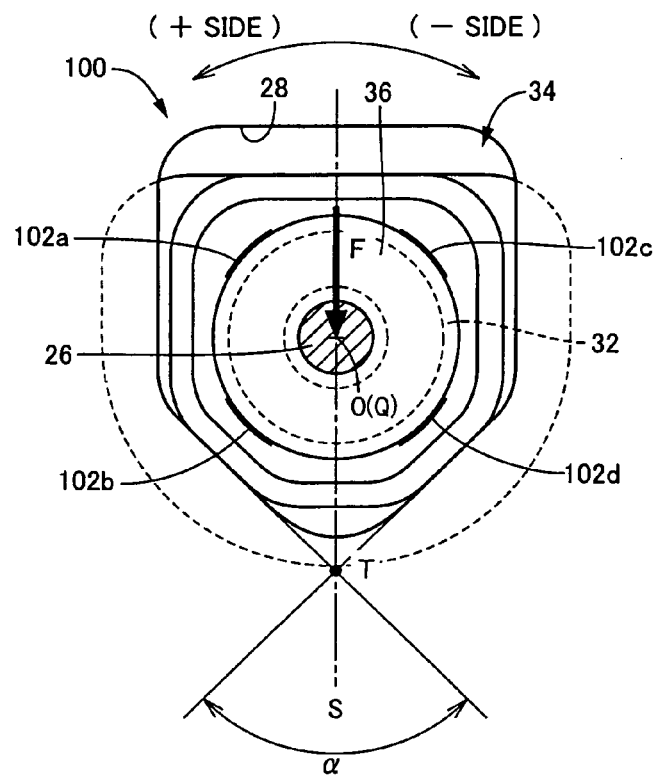
FIG. 10 is an illustrative view for illustrating another example of a load sensor, and is a front view corresponding to FIG. 2.

A load sensor 100 shown in FIG. 10 has the same fundamental structure as that of the embodiments set forth above, and includes the strain body 32, the case member 34 and the shaft-like member 36. However, the four strain resistance elements 102a to 102d placed in positions different from those of the embodiments described above. That is, the four strain resistance elements 102a to 102d are disposed in four area, demarcated with the neutral plane S and another plane passing across the axis, i.e., the centerline O, of the strain body 32 to be perpendicular to the neutral plane S, in a symmetrically positional relationship with respect to the neutral plane S. More particularly, the four strain resistance elements 102a to 102d are placed at four positions on the strain body 32 by approximately 90° so as to intersect with two straight lines passing across the centerline O (axis Q) of the sensor while crossing the neutral plane S at an angle of approximately 45°. The central positions of the strain resistance elements 102a to 102d correspond to positions where two straight lines cross with the strain body 32.

In such a case, when the input load F is applied in a direction aligned with the neutral line S, the strain resistance elements 102b and 102d and the strain resistance elements 102c and 102a, placed in symmetric positions to be distanced from each other on opposite sides of the neutral plane S, are deformed at approximately equal rates, providing equalized strain values. If the direction of the input load varies, the strain resistance elements 102b and 102d and the strain resistance elements 102c and 102a are deformed in different modes, respectively, thereby varying the strain values.

Figure 11:
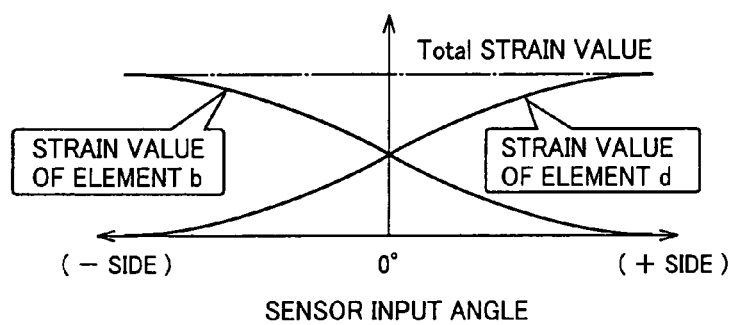
FIG. 11 is an illustrative view showing varying characteristics in strain values of a pair of strain detecting elements placed on both sides of the neutral plane S symmetrically in the load sensor shown in FIG. 10.

The strain values of the strain resistance elements 102b and 102d will be described below in detail. As shown in FIG. 11, if an input load with a fixed magnitude is applied in varying directions, the strain resistance elements 102b and 102d vary in opposite characteristics with a sensor input angle (representing the direction of the input load F)=0° placed therebetween in coincidence with the neutral plane S. A sum of the strain value of the strain resistance elements 102b and the strain value of the strain resistance elements 102d, i.e., a total strain value of both of these strain values, is maintained at a approximately fixed value on negative or positive sides of the sensor input angle, regardless of a variation in the sensor input angle. This situation similarly applies to the strain resistance elements 102c and 102a.

Figure 12A:
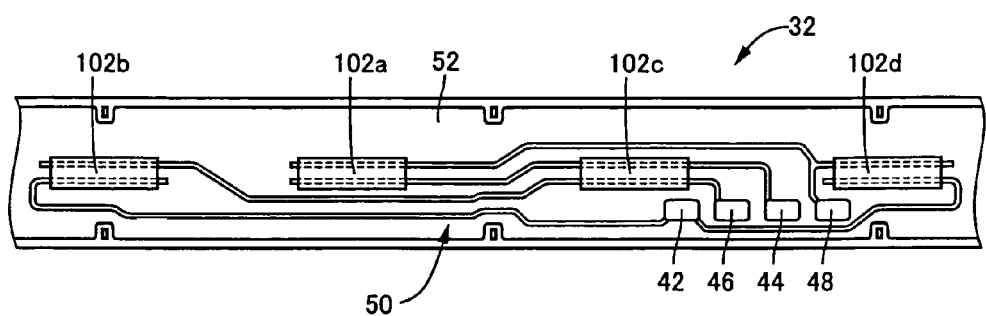
FIGS. 12A and 12B are illustrative views for illustrating an electrical circuit of the load sensor shown in FIG. 10.
Figure 12B:
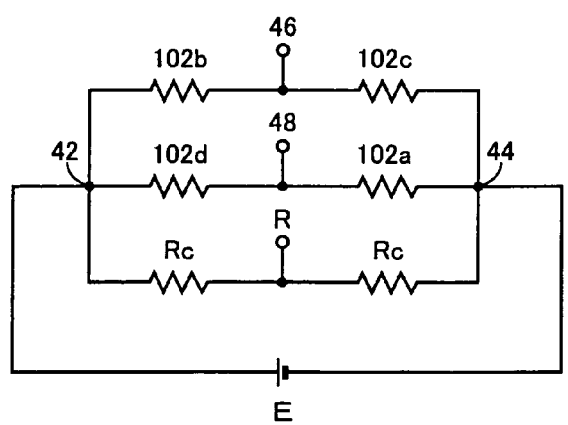

Accordingly, by detecting the total strain value of the strain resistance elements 102b and 102d or the total strain value of the strain resistance elements 102c and 102a placed on both sides of the neutral plane S, the operating force can be detected with high precision regardless of the variation in sensor input angle. FIGS. 12A, and 12B are views showing a bridge circuit for detecting the operating force (corresponding to the input load F) using these strain resistance elements 102a to 102d. FIG. 12A corresponds to FIG. 5C and FIG. 12B corresponds to FIG. 6. With a circuit shown in FIG. 12B, fixed resistances Rc are located in an area, separated from the strain body 32, of a vehicular control circuit section or the like for instance to which the strain body 32 is connected via the wire harness 56 and the connector 58. With the input load F varied in applied direction, the strain values (resistance values) of the strain resistance elements 102a to 102d vary continuously. Therefore, the sensor input angle, i.e., the depressing stroke of the operating pedal 16 can be detected at a rate depending on the variation in strain values (resistance values).

Embodiment 4

Figure 13A:
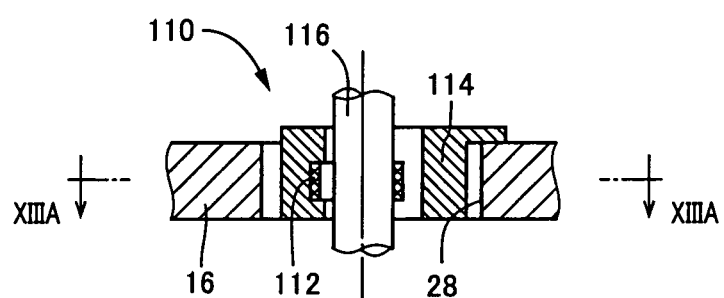
FIGS. 13A and 13B are views, corresponding to FIGS. 3A and 3B, for showing still another example of a load sensor.
Figure 13B:
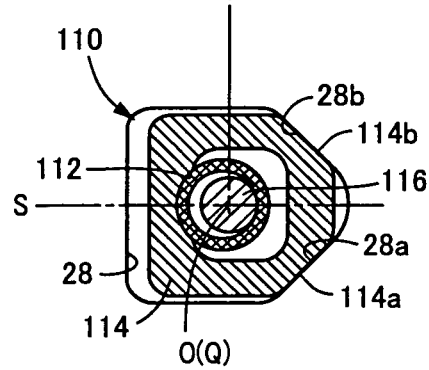
Figure 14A:
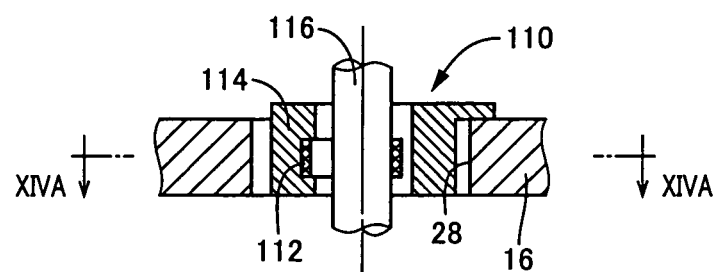
FIGS. 14A and 14B are cross sectional views showing the load sensor, remaining under a state shown in FIGS. 13A and 13B, which is applied with the input load F to cause the strain body to be tensile-deformed in an elliptical configuration.
Figure 14B:
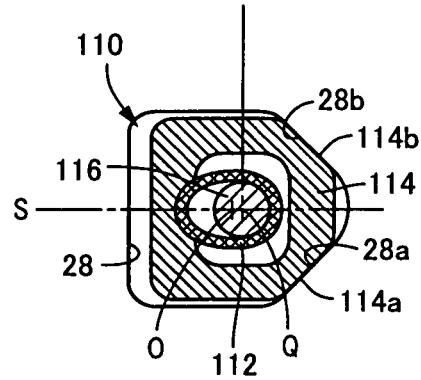

FIGS. 13A and 13B and FIGS. 14A and 14B show a load sensor 110 of another type different from the load sensor 30 in cross sectionals corresponding to FIGS. 3A and 3B and FIGS. 4A and 4B. FIGS. 13A and 14A are vertical cross sectional views taken on the neutral plane S; FIGS. 13B and 14B are cross sectional views taken on line XIIIA-XIIIA of FIG. 13A and XIVA-XIVA of FIG. 14A, respectively.

The load sensor 110 includes a cylindrical strain body 112 that detects a load applied in a radial direction thereof. A case member 114 placed in an outer circumferential side of the strain body 112 has an outer circumferential surface, formed in the same home base configuration as that of the outer circumferential wall 62 of the case member 34. The case member 114 is assembled to the sensor-mounting hole 28 in a fixed posture with a pair of mounting surfaces 114a and 114b held in surface contact with the rest surfaces 28a and 28b, respectively. In addition, the case member 114 integrally retains the strain body 112 on a partial area (a sidewall portion of the strain body 112 on a left side thereof as viewed in FIGS. 13A and 13B and FIGS. 14A and 14B) thereof around the centerline of the strain body 112 by welding or the like.

The strain body 112 has a cylindrical interior through which a shaft-like member 116 extends with both axial ends pivotably supported with the clevis 24 relatively. In this case, the shaft-like member 116 is commonly used as a clevis pin, i.e., a connecting pin of the pivotably connecting section 20.

With the load sensor 110 of such a structure, when the input load F becomes nearly zero, the case member 114 is kept approximately concentric to the axis Q of the shaft-like member 116 as viewed in FIGS. 13A and 13B. In addition, the strain body 112 is kept decentered from the axis Q such that a leftward sidewall portion has an outer periphery fixedly secured to the case member 114 in a radial direction whereas a rightward sidewall portion has an inner periphery approximately held in contact with the shaft-like member 116 as viewed in FIGS. 13A and 13B. Such a situation is specified with the operating rod 22 pressed rightward as viewed in FIG. 1A due to the action of a return spring or the like (not shown) to cause the operating pedal 16 to be contacted with a stopper (not shown) to be positioned at an initial position. Under such a situation, the strain body 112 has a cylindrical configuration formed in an approximately perfect circle in cross section.

In accordance with depression of the operating pedal 16, a load is radially applied between the case member 114 and the shaft-like member 116 due to the reactive force of the operating rod 22. Then, the shaft-like member 116 is displaced rightward, as viewed in FIGS. 13A and 13B and FIGS. 14A and 14B, relative to the case member 114. This causes the strain body 112 to be tensile-deformed in an elliptical shape as shown in FIGS. 14A and 14B. The case member 114 has an annular interior space determined in size to permit the relative displacement of the shaft-like member 116 and the tensile deformation of the strain body 112. Further, the strain body 112 is made of metallic material such as ferritic stainless steel or the like, which can be elastically deformed upon receipt of a radial load. Accordingly, in accordance with depression of the operating pedal 16, the strain body 112 is tensile-deformed at a rate depending on the operating force.

For detecting the tensile strain of the strain body 112, the strain resistance elements (not shown) serving as strain detecting elements, are fixed to the outer circumferential surface of the strain body 112 on sidewall portions at upper and lower parts in FIG. 14B. These areas subjected to tensile strain for detecting the operating force. The outer circumferential surface of the strain body 112 is preliminarily formed with an insulating film such as a glass paste layer or the like in the same manner as those of the illustrated embodiments discussed above. Electrically conductive material such as silver or the like, is formed on the insulating film, thereby forming an electrically conductive circuit pattern. In addition, the strain resistance elements are integrally formed using sintering i.e. firing technique or the like such that parts thereof are kept in contact with the electrically conductive circuit pattern.

Even with the fourth embodiment, the load sensor 110 employs the case member 114 having the outer circumferential surface formed in the same home base configuration as that of the outer circumferential wall 62 of the case member 34. The case member 114 is assembled to the sensor-mounting hole 28 in a fixed posture with the pair of mounting surfaces 114a and 114b held in surface contact with the rest surfaces 28a and 28b, respectively. This minimizes the flexure deformation of the case member 114 caused by stress concentration, the positional displacement caused by the directional variation of the input load F and the posture variation or the like, thereby obtaining the same advantageous effects, such as high detecting precision, as those of the illustrated embodiments described above.

Embodiment 5

Figure 15A:
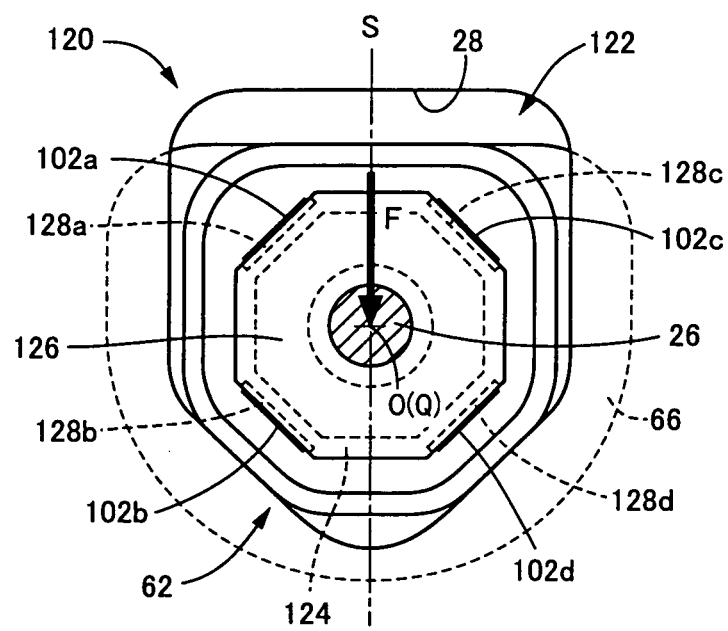
FIGS. 15A and 15B are illustrative views for illustrating a still another example of a load sensor.
Figure 15B:
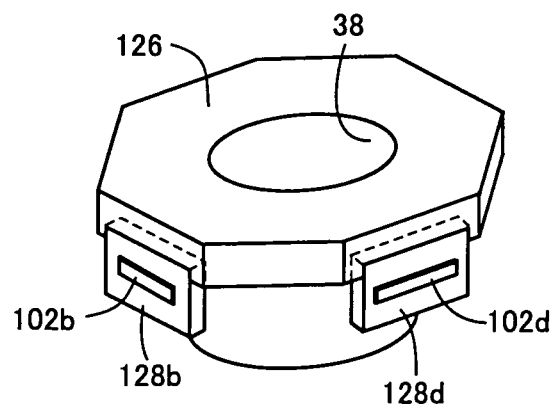

FIGS. 15A and 15B show a load sensor 120 of another embodiment. FIG. 15A is a front view corresponding to FIGS. 2 and 10, and FIG. 15B is a perspective view showing the shaft-like member 126 and parts of plate-like members 128a to 128d. With the load sensor 120, a case member 122 has a connecting portion 214 formed in an octagonal cylindrical configuration, and a shaft-like member 126 has an octagonal shape approximately lapping over the connecting portion 124 as viewed in a flat plane (identical to the front view of FIG. 15A). Among the eight sides of the octagonal body, four sides placed on every other positions, i.e., four areas demarcated with the neutral plane S and the planes passing across the axis Q to be perpendicular thereto, carry four flat plate-like members 128a to 128d in integrally fixed states, respectively, so as to straddle between the connecting portion 124 and the shaft-like member 126.

The plate-like members 128a to 128d collectively functioning as the strain body, are made of metallic material such as ferritic stainless steel or the like, which can be elastically deformed upon receipt of a shear load applied in a plate-thickness direction. The plate-like members 128a to 128d are placed in areas around the axis Q in parallel to the axis Q on a positional relationship symmetrical with respect to the neutral plane S, i.e., more particularly, in a posture inclined at an angle of approximately 45° with respect thereto. The plate-like members 128a to 128d have lower end portions integrally fixed to the connecting portion 124 of the case member 122. The strain resistance elements 102a to 102d mounted on outer sidewalls of the plate-like members 128a to 128d, respectively, can detect the operating force (corresponding to the input load F) and the depressing stroke of the operating pedal 16 in the same manner as that in the above load sensor 100.

Figure 16A:
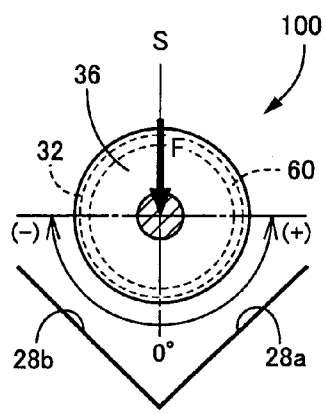
FIGS. 16A to 16C are illustrative views for illustrating an effect of the load sensor 100, shown in FIGS. 15A and 15B, for improving detection sensitivity in contrast to an effect of the load sensor shown in FIG. 10.
Figure 16B:
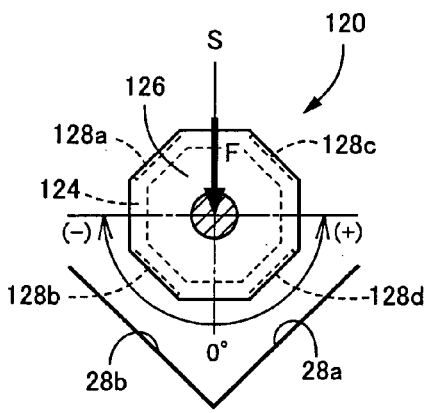
Figure 16C:
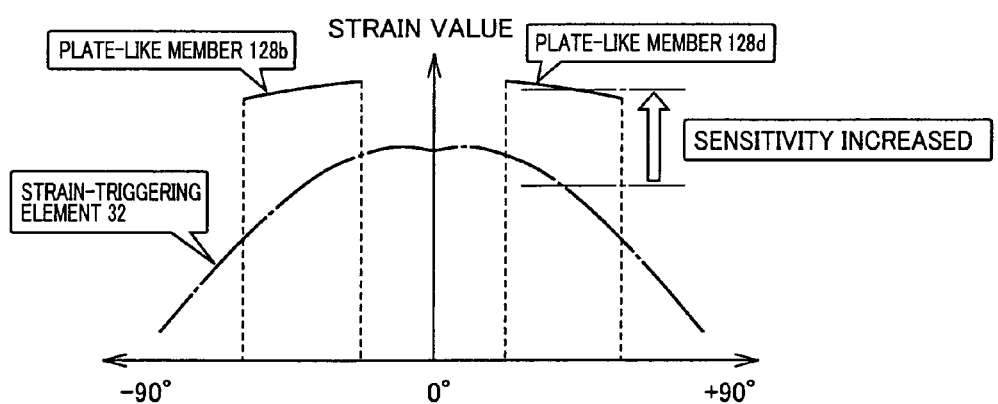

Even with the load sensor 120 of the fifth embodiment, like the load sensor 100 shown in FIG. 10, the input load F acts on the four flat plate-like members 128a to 128d disposed to be spaced with each other about the axis of the shaft-like member 126, collectively serving as the strain body, in concentration. This allows a strain value resulting from shear strain to be greater than that of the cylindrical strain body 32 as shown in FIGS. 16A and 16B, providing improved sensitivity and detecting precision. In detail, FIG. 16C shows a graph, plotted on a single dot line, which is related to the strain body 32 of the load sensor 100 as shown in FIG. 16A. Graphs (plotted in two positions) of the strain values indicated by solid lines relate to the pair of plate-like members 128b and 128d placed on the load sensor 120 of the present embodiment in lower sides thereof.

Embodiment 6

Figure 17:
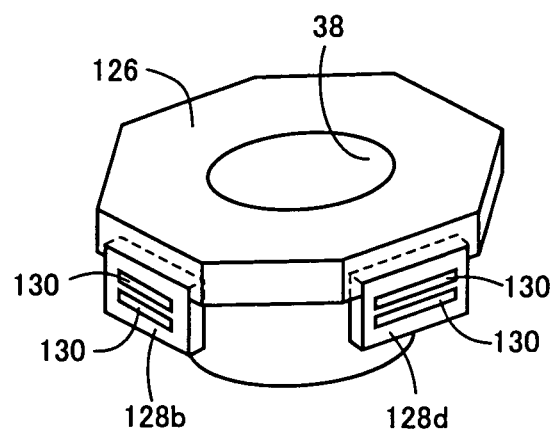
FIG. 17 is a perspective view, corresponding to FIG. 15B, of the embodiment shown in FIGS. 15A and 15B with a pair of strain detecting elements being mounted on a single sheet of plate-like member.

In the illustrated embodiment described above, the strain resistance elements 102a to 102d are mounted on the four plate-like members 128a to 128d one by one, respectively. However, strain detecting elements 130 such as strain resistance elements or the like, may be mounted on the plate-like members 128b and 128d two by two in upper and lower distanced positions as shown in FIG. 17 to detect strains on two areas in compression deformation and tensile deformation. Strain signals are taken out from the bridge circuit formed in the same manner as the circuit of FIG. 6.

Embodiment 7

Figure 18A:
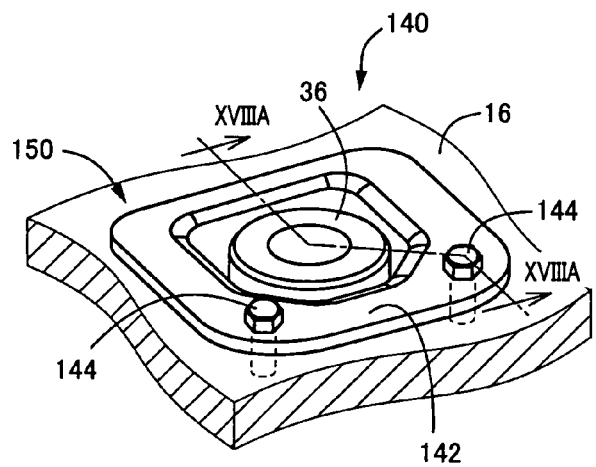
FIGS. 18A and 18B are illustrative views for illustrating a still another example of a load sensor.
Figure 18B:
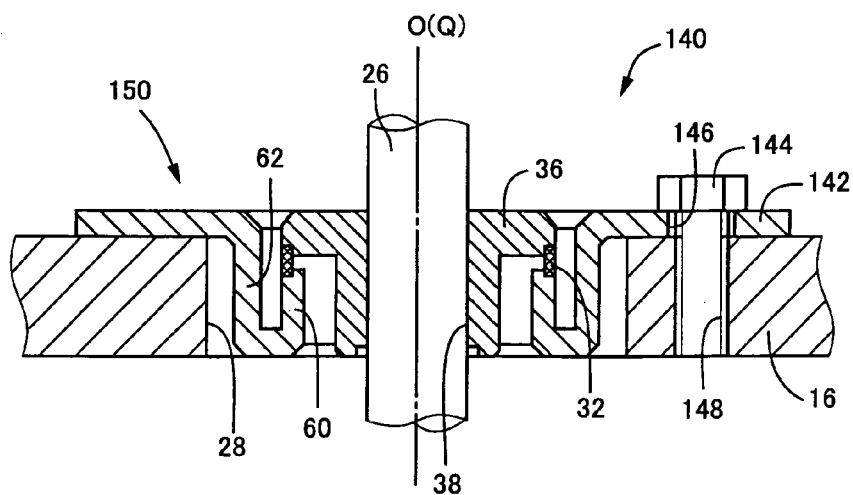

FIGS. 18A and 18B show a load sensor 140 of another embodiment. FIG. 18A is a perspective view showing a neighborhood of a sensor-mounting area of the operating pedal 16, and FIG. 18B is an enlarged cross sectional view taken on line XVIIIA-XVIIIA of FIG. 18A. The load sensor 140 includes a case member 150 formed with a mounting flange 142 protruding toward an outer circumferential area over an entire circumference of an outer circumferential wall 62 in place of the positioning flange 66, in contrast to the load sensor 30 shown in FIGS. 3A and 3B. The mounting flange 142 is formed insertion bores 146 at two predetermined positions.

With the case member 150, the outer circumferential wall 62 is inserted to the sensor-mounting hole 28 with a predetermined play over an entire circumference thereof, and two fixture bolts 144 are inserted to the insertion bores 146 to be screwed into threaded bores 148 of the operating pedal 16. That is, the case member 150 is integrally fixed to the operating pedal 16 via the fixture bolts 144. Among various areas of the mounting flange 142, one area formed with the insertion bore 146 represents a fixing-mount portion corresponding to the claimed mounting portion. Among various areas of the operating pedal 16, one area formed with the threaded bores 148 represents a fixed-mount portion corresponding to the claimed load receiving portion. The fixture bolts 144 are screw members corresponding to claimed the fixing means.

Description is made of two fixing-mount portions to be fixed to the operating pedal 16 using the fixture bolts 144, i.e., an area in which the insertion bores 146 are formed. As shown in FIGS. 19A and 19B, a pair of fixing-mount portions are provided on the case member 150 in the same direction as that of the input load F, i.e., in downstream positions to assume lower positions in FIGS. 19A and 19B. They are disposed symmetrically with respect to the neutral plane S at positions to be distanced from each other by a predetermined opening angle γ about the axis Q of the shaft-like member 36, i.e., the sensor centerline O.

The opening angle γ is determined to be greater than the variable angle β oriented in the input load F. Thus, even if the direction of the input load F is varied in accordance with depression of the operating pedal, the direction of the input load F always remains in a range of the opening angle γ. FIG. 19A is a plan view of the case member 150 as viewed from an upper area in FIG. 18B, and FIG. 19B is a bottom view (corresponding to the front view of FIG. 2) as viewed from a lower area in opposition. The neutral plane S, parallel to the axis O approximately aligned with the direction of the input load F at the intermediate point of the depressing stroke of the operating pedal 16, corresponds to a claimed symmetric plane G.

With the load sensor 140 of such a structure, the mounting flange 142 integrally formed with the case member 150, has the two fixing-mount portions (areas at which the insertion bores 146 are formed) distanced from each other by the opening angle γ about the axis Q. The fixing-mount portions are integrally fixed to two fixed-mount portions (areas at which the threaded bores 148 are formed) of the operating pedal 16 by means of the fixture bolts 144. Further, the opening angle γ is determined to be greater than the variable angle β oriented in the input load F available to vary due to relative pivotal movement of the pivotably connecting section 20 in accordance with depression of the operating pedal 16 such that the direction of the input load F lies in a position between the two fixing-mount portions (insertion bores 146).

For this reason, the operating pedal 16 always bears the input load F via the two fixing-mount portions (insertion bores 146) and the fixed-mount portions (threaded bores 148), thereby minimizing the flexure deformation of the case member 150 caused by stress concentration. This prevents the undesirable deformation or the reduction in the deformed amount (strain value) of the strain body 32 caused by the flexure deformation. Thus, the present embodiment has the same advantageous effects as those of the illustrated embodiments described above, such as improved detecting precision of the operating force, and the structure formed in lighter weight at lower cost than those of a case using high-strength steel with lessened flexure deformation or adopting a case member of a large size.

Figure 20A:
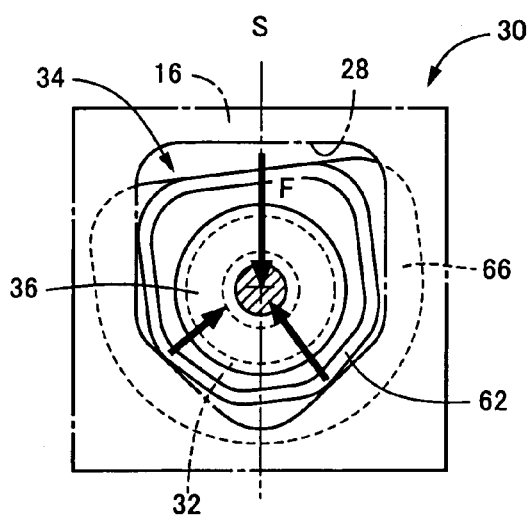
FIGS. 20A and 20B are illustrative views for illustrating a possibility in which a variation occurs in detecting performance of the bad sensor shown in FIGS. 3A and 3B.
Figure 20B:
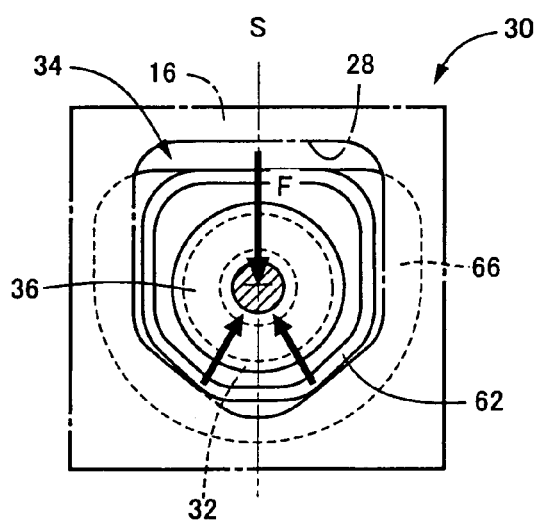

With the structure in which the pair of mounting wall portions 62a and 62b are surface contacted with the rest surfaces 28a and 28b like the load sensor 30 shown in FIGS. 3A and 3B, there are various concerns as described below. That is, the presence of a dimensional variation and an installation error or the like results in a posture variation of the case member 34, as shown, for instance, in FIG. 20A, and deviated abutting engagement as shown in FIG. 20B. Such cases involve risk of deterioration occurring in precision of detecting the operating force.

In the seventh illustrated embodiment, the two fixing-mount portions (placed at the insertion bores 146) are integrally fixed to the fixed-mount portions (placed at the threaded portions 148) using the pair of fixture bolts 144. Therefore, the case member 150 can be always placed in a fixed posture relative to the operating pedal 16, thereby providing stabilized detecting precision in high reliability.

With the present embodiment, the fixing-mount portions (the areas in which the insertion bores 146 are formed) are integrally fixed to the fixed-mount portions (the areas in which the threaded portions 148 are formed) with the fixture bolts 144 used as the fixing means. This allows the device to be structured at further lower cost than that at which the associated component parts are fixed to each other by welding or the like.

While the present invention has been described above with reference to the illustrated embodiments shown in the drawings, these embodiments are meant to be illustrative only, and the present invention may be implemented in various modifications and improvements in the light of knowledge of those skilled in the art.

What is claimed is:

1. A load-sensor-equipped vehicle operating pedal device, comprising:
   an operating pedal mounted on a pedal support fixedly secured to a vehicle, to be pivotable about an axis of a support shaft and depressable by an operator;
   a reactive member receiving an operating force of the operating pedal and generating a reactive force corresponding to the operating force;
   at least one pivotably connecting section, interposed between the operating pedal and the reactive member, having a pair of component members pivotably connected relative to each other about a connecting pin, and transmitting the operating force through the connecting pin; and
   a load sensor electrically detecting the operating force; wherein
   the load sensor includes (i) a shaft member, (ii) an annular case member being disposed radially outside the shaft member to be relatively displaced in a direction perpendicular to an axis of the shaft member and radially surrounding the shaft member, (iii) a strain body disposed between the shaft member and the case member to straddle the shaft member and the case member, and (iv) strain detecting elements fixed to the strain body, wherein the reactive force causes the shaft member and the case member to relatively move in the direction perpendicular to the axis of the shaft member to deform the strain body such that the strain detecting elements detect a deformation of the strain body;
   the case member is fitted to a sensor-mounting hole formed in a sensor mounting member comprised of either one of the component members connected to each other via the connecting pin in the pivotably connecting section, and the shaft member is connected to the other one of the component members via the connecting pin;
   the case member has a plurality of mounting portions engaged with a plurality of load receiving portions formed in the sensor-mounting hole respectively, and is positionally disposed in the sensor-mounting member in a fixed posture;
   even when a direction of an input load F transmitted from the shaft member to the case member via the strain body relatively varies due to relatively pivotal movement of the pivotably connecting section in accordance with depression of the operating pedal, the plurality of load receiving portions always bear the input load F via the plurality of mounting portions;
   the plurality of mounting portions include a pair of flat mounting surfaces formed into a V-shaped profile on a plane perpendicular to the axis of the shaft member with a predetermined apex angle α, and the plurality of load receiving portions include a pair of flat rest surfaces formed into a V-shaped profile in the sensor-mounting hole in conjunction with the flat mounting surfaces; and
   the case member is positioned in the fixed posture such that, with the pair of flat mounting surfaces being brought into surface contact with the pair of flat rest surfaces respectively, the pair of flat mounting surfaces are pressed against the pair of flat rest surfaces by the input load F.

2. The load-sensor-equipped vehicle operating pedal device according to claim 1, wherein orientations of the flat rest surfaces and the apex angle α are determined such that even when the direction of the input load F relatively varies due to the relatively pivotal movement of the pivotably connecting section in accordance with depression of the operating pedal, the pair of flat mounting surfaces are always pressed against the pair of flat rest surfaces respectively based on the input load F.

3. The load-sensor-equipped vehicle operating pedal device according to claim 2, wherein the orientations of the flat rest surfaces and the apex angle α are determined such that even when the direction of the input load F relatively varies due to the relatively pivotal movement of the pivotably connecting section in accordance with depression of the operating pedal, the pair of flat mounting surfaces always generate component forces oriented toward an apex point of the V-shaped profile due to reactive forces arising from the flat rest surfaces.

4. The load-sensor-equipped vehicle operating pedal device according to claim 1, wherein the apex angle α is selected smaller than an angle (180°-β) for a variable angle β in a direction of the varying input load F varying due to the relatively pivotal movement of the pivotably connecting section in accordance with depression of the operating pedal,
wherein the variable angle β is preferably set to be in a range of (β≤120°).

5. The load-sensor-equipped vehicle operating pedal device according to claim 1, wherein the pair of flat mounting surfaces are formed symmetrically with respect to a neutral plane S involving the apex point of the V-shaped profile converged with the pair of flat mounting surfaces, and the axis of the shaft member in an unloaded state.

6. The load-sensor-equipped vehicle operating pedal device according to claim 5, wherein
the case member has an inner circumferential connecting portion to which the strain body is integrally connected, a cylindrical outer circumferential wall formed outside the connecting portion to surround the connecting portion, and a planar connecting flange connecting the outer circumferential wall and the connecting portion integrally to each other; and
the outer circumferential wall has a pair of planar mounting wall portions of which outer side surfaces form the pair of flat mounting surfaces, a pair of flat planar parallel wall portions formed continuously to the pair of mounting wall portions in parallel to the neutral plane S and in symmetrical with the neutral plane S, and a clearance is provided between the sensor-mounting hole and the outer circumferential wall except for the mounting wall portions.

7. The load-sensor-equipped vehicle operating pedal device according to claim 5, wherein
the strain body has a hollow cylindrical shape and is disposed concentrical with the shaft member; and
the strain detecting elements are provided on an outer circumferential surface or an inner circumferential surface of the strain body over a predetermined angular range which is symmetrical with respect to the neutral plane S.

8. The load-sensor-equipped vehicle operating pedal device according to claim 7, wherein four strain detecting elements are provided at four positions demarcated with the neutral plane S and a plane passing through the axis of the strain body to be perpendicular to the neutral plane S, which are symmetrical with respect to the neutral plane S.

9. The load-sensor-equipped vehicle operating pedal device according to claim 1, wherein
the sensor-mounting member includes a planar member being pivotably connected to the reactive member about the connecting pin, and having the sensor-mounting hole penetratingly formed with the pair of flat rest surfaces;
the load sensor allows the case member to be disposed in the sensor-mounting hole such that the pair of flat mounting surfaces are surface contacted with the pair of flat rest surfaces, respectively;
the connecting pin is inserted along the axis of the shaft member to protrude from both axial ends of the sensor-mounting hole; and
the connecting pin has both axial ends retained with a U-shaped clevis integrally fixed to the reactive member.

10. The load-sensor-equipped vehicle operating pedal device according to claim 1, wherein
the strain body has a hollow cylindrical configuration of which one end and other end are integrally fixed to the case member and the shaft member respectively, so that a shear strain occurring in the strain body by a relative displacement between the case member and the shaft member in response to the reactive force is detected by the strain detecting elements.

11. The load-sensor-equipped vehicle operating pedal device according to claim 1, wherein
the strain body includes a plurality of flat plate members placed on the shaft member around the axis of the shaft member at intervals spaced from each other in parallel to the axis of the shaft member, each of which has both axial ends integrally fixed to the shaft member and the case member respectively, so that a shear strain occurring in the plate members by a relative displacement between the case member and the shaft member in response to the reactive force is detected by the strain detecting elements.

12. The load-sensor-equipped vehicle operating pedal device according to claim 1, wherein
the plurality of mounting portions include two fixing-mount portions provided on a mounting flange integrally formed with the case member to extend in a direction perpendicular to the axis of the shaft member, to be separated from each other by a predetermined opening angle γ about the axis of the shaft member, and the load receiving portions include fixed-mount portions in which the fixing-mount portions are integrally fixed by predetermined fixing means; and
the opening angle γ is greater than a variable angle β of a direction of the input load F varying due to relatively pivotal movement of the pivotably connecting section in accordance with depression of the operating pedal, so that the two fixing-mount portions are determined to allow the direction of the input load F to lie in an area therebetween.

13. The load-sensor-equipped vehicle operating pedal device according to claim 12, wherein the fixing means include screw members.

14. The load-sensor-equipped vehicle operating pedal device according to claim 12, wherein
the two fixing-mount portions are set in symmetric positions interposing a symmetric plane G determined to involve the axis of the shaft member, on an intermediate position within a range of the variable angle β of the direction of the input load F.

15. The load-sensor-equipped vehicle operating pedal device according to claim 12, wherein
the case member includes an inner circumferential connecting portion to which the strain body is integrally connected, a cylindrical outer circumferential wall disposed radially outside the connecting portion to surround the connecting portion, a plate connecting flange integrally interconnecting the outer circumferential wall and the connecting portion to each other, and the mounting flange is extended outwardly from one end portion of the outer circumferential wall at an approximately right angle.

16. The load-sensor-equipped vehicle operating pedal device according to claim 14, wherein
the strain body has a hollow cylindrical shape and is disposed concentrical with the shaft member; and
the plurality of strain detecting elements are provided on the strain body at the outer circumferential surface or inner circumferential surface of the strain body over a predetermined angular range which is symmetrical with respect to the symmetric plane G.

17. The load-sensor-equipped vehicle operating pedal device according to claim 16, wherein
four strain detecting elements are provided at four positions demarcated with the symmetric plane G and a plane passing through the axis of the strain body to be perpendicular to the symmetric plane G which is symmetrical with respect to the symmetric plane G.

18. The load-sensor-equipped vehicle operating pedal device according to claim 15, wherein
the sensor-mounting member includes a plate member which is pivotably connected to the reactive member about the connecting pin, and through which a sensor-mounting hole is penetratingly formed;
the load sensor is disposed in the sensor-mounting member such that the outer circumferential wall of the case member is inserted into the sensor-mounting hole to provide a play over an entire circumference of the outer circumferential wall, in a condition in which the mounting flange is contacted with a side surface of the sensor-mounting member;
the connecting pin is inserted along the axis of the shaft member to protrude toward both axial ends of the sensor-mounting hole; and
the connecting pin has both axial ends retained with a U-shaped clevis integrally fixed to the reactive member.

19. The load-sensor-equipped vehicle operating pedal device according to claim 12, wherein
the strain body has a hollow cylindrical configuration of which one end and other end are integrally fixed to the case member and the shaft member respectively, so that a shear strain occurring in the strain body by a relative displacement between the case member and the shaft member in response to the reactive force is detected by the strain detecting elements.

\* \* \* \* \*